(12) United States Patent
Stanley et al.

(10) Patent No.: US 10,962,124 B1
(45) Date of Patent: Mar. 30, 2021

(54) FLUIDIC LATCHES, SYSTEMS, AND METHODS

(71) Applicant: Facebook Technologies, LLC, Menlo Park, CA (US)

(72) Inventors: Andrew Arthur Stanley, Seattle, WA (US); Erik Roby, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 56 days.

(21) Appl. No.: 16/369,888

(22) Filed: Mar. 29, 2019

(51) Int. Cl.
*F16K 7/12* (2006.01)
*F16K 31/126* (2006.01)

(52) U.S. Cl.
CPC .......... *F16K 7/123* (2013.01); *F16K 31/1266* (2013.01)

(58) Field of Classification Search
CPC .......... F16K 11/022; F16K 11/02; F16K 7/12; F16K 7/123; F16K 31/1266; Y10T 137/86879; Y10T 137/86558; Y10T 137/87161
See application file for complete search history.

(56) References Cited

U.S. PATENT DOCUMENTS

| | | | | |
|---|---|---|---|---|
| 2,677,390 A * | 5/1954 | Davis | .................. | F16K 31/1266 137/594 |
| 2,930,391 A * | 3/1960 | Bass | .................... | B60T 11/323 137/118.03 |
| 3,113,756 A * | 12/1963 | Griffo | .................. | F16K 31/1266 251/57 |
| 3,186,234 A * | 6/1965 | Solnick | .................. | G01N 30/20 73/863.71 |
| 3,707,982 A * | 1/1973 | Hogel | ..................... | F15B 13/00 137/119.08 |
| 4,119,120 A * | 10/1978 | Mehaffy | ................ | G01N 30/20 137/885 |
| 4,924,905 A * | 5/1990 | Mastromatteo | ..... | G01L 19/0645 137/498 |
| 5,176,359 A * | 1/1993 | Leveson | ................... | F16K 7/17 137/884 |
| 9,044,752 B2 * | 6/2015 | Wimberger-Friedl | ...................... | F04B 43/043 |

(Continued)

OTHER PUBLICATIONS

Telepneumatic, "Pneumatic Logic & Controls", URL: https://www.parker.com/literature/Literature%20Files/pneumatic/Literature/Telepneumatic/PCC-4.pdf, Jun. 30, 2017, 104 pages.

*Primary Examiner* — Umashankar Venkatesan
(74) *Attorney, Agent, or Firm* — FisherBroyles, LLP

(57) ABSTRACT

A fluidic latch device may include an input port, an additional input port, an output port, an additional output port, a pressure chamber, an additional pressure chamber, and a flexible membrane. The pressure chamber may include an inlet coupled to the input port by a first fluid channel and an outlet coupled to the output port by a second fluid channel, and the additional pressure chamber may include an additional inlet coupled to the additional input port by a third fluid channel and an additional outlet coupled to the additional output port by a fourth fluid channel. The flexible membrane may separate the pressure chamber and the additional pressure chamber and be configured to (1) block, when the membrane is in an expanded state, the outlet of the pressure chamber and (2) block, when the membrane is in an additional expanded state, the additional outlet of the additional pressure chamber.

20 Claims, 19 Drawing Sheets

(56) References Cited

U.S. PATENT DOCUMENTS 10,215,738 B2 * 2/2019 Gellert .................. F16K 11/022
2006/0169941 A1 * 8/2006 Glime ....................... F16K 1/34
251/331

* cited by examiner

| RADIAL-LATCH TRUTH TABLE 1300 | | | |
|---|---|---|---|
| INPUTS | | OUTPUTS | |
| A | B | QA | QB |
| 0 | 0 | 0 | 0 |
| 1 | 0 | 1 | 0 |
| 0 | 1 | 0 | 1 |
| 1 | 1 | HOLD | HOLD |

*FIG. 13*

FLUIDIC LATCHES, SYSTEMS, AND METHODS

BACKGROUND

Fluidic systems are small mechanical systems that involve the flow of fluids. Fluidic systems can be used in many different fields, such as biomedical, chemical, genetic, biochemical, pharmaceutical, haptics, and other fields. Fluidic systems may be made up of various composable fluidic devices that may be coupled together to form a composite fluidic system. A fluidic valve is a basic component of fluidic systems and may be used for stopping, starting, or otherwise controlling flow of a fluid in a fluidic system. Conventional fluidic valves may be actuated via fluid pressure, with a piezoelectric material, or a spring-loaded mechanism, for example.

Fluidic devices are fluid handling devices that function analogous to electronic devices. Fluidic circuits and systems are often used to perform tasks and operations typically performed by conventional electronic circuits and systems. In some fields, fluidic systems may be replacing these electronic circuits and systems. Conventional fluidic valves may be used to perform tasks and operations similar to conventional electrical transistors such as performing control functions, performing logic operations (e.g., binary logical operations), and storing or transmitting information. Accordingly, the present disclosure recognizes a need and provides solutions for improved fluidic valves and systems and methods used for controlling fluid flows and pressures in fluidic systems.

SUMMARY

As will be described in greater detail below, the instant disclosure describes fluidic latches and systems that may store information or state. In some examples, a fluidic latch device may include an input port, an additional input port, an output port, an additional output port, a pressure chamber, an additional pressure chamber, and a flexible membrane. In some examples, the pressure chamber may include an inlet coupled to the input port by a first fluid channel and an outlet coupled to the output port by a second fluid channel, and the additional pressure chamber may include an additional inlet coupled to the additional input port by a third fluid channel and an additional outlet coupled to the additional output port by a fourth fluid channel. In these examples, the flexible membrane may separate the pressure chamber and the additional pressure chamber and be configured to (1) block, when the flexible membrane is in an expanded state, the outlet of the pressure chamber and (2) block, when the flexible membrane is in an additional expanded state, the additional outlet of the additional pressure chamber. In some examples, the flexible membrane may also be configured to (1) unblock, when the flexible membrane is in an intermediate state or the additional expanded state, the outlet of the pressure chamber and (2) unblock, when the flexible membrane is in the intermediate state or the expanded state, the additional outlet of the additional pressure chamber. In at least one example, the total surface area of the flexible membrane exposed to the pressure chamber when the flexible membrane is in the intermediate state may be substantially equal to the total surface area of the flexible membrane exposed to the additional pressure chamber when the flexible membrane is in the intermediate state.

In some examples, the pressure chamber may include a circular wall, and the additional pressure chamber may include an additional circular wall. In at least one example, the outlet may be centered in the circular wall, and the additional outlet may be centered in the additional circular wall. In certain examples, the fluidic latch device may further include (1) a contact protrusion surrounding the outlet and evenly extends towards the flexible membrane into the pressure chamber and (2) an additional contact protrusion surrounding the additional outlet and evenly extends towards the flexible membrane into the additional pressure chamber. In these examples, the flexible membrane may be configured to contact, when in the expanded state, the contact protrusion and/or contact, when in the additional expanded state, the additional contact protrusion.

In some examples, the fluidic latch device may further include a substantially rigid layer and an additional substantially rigid layer. The substantially rigid layer may form the input port, the output port, the pressure chamber, the inlet, the outlet, the first fluid channel, and the second fluid channel, and the additional substantially rigid layer may form the additional input port, the additional output port, the additional pressure chamber, the additional inlet, the additional outlet, the third fluid channel, and the fourth fluid channel. The flexible membrane may be sandwiched between opposing faces of the substantially rigid layer and the additional substantially rigid layer. In some examples, the area of the outlet may be equal to the area of the additional outlet, and/or the volume of the pressure chamber may be equal to the volume of the additional pressure chamber.

A corresponding fluidic system may include a latch, a pressure source, an additional pressure source, and a load. The latch may include an input port, an additional input port, an output port, an additional output port, a pressure chamber, an additional pressure chamber, and a flexible membrane. In some examples, the pressure chamber may include an inlet coupled to the input port by a first fluid channel and an outlet coupled to the output port by a second fluid channel, and the additional pressure chamber may include an additional inlet coupled to the additional input port by a third fluid channel and an additional outlet coupled to the additional output port by a fourth fluid channel. In such examples, the flexible membrane may separate the pressure chamber and the additional pressure chamber and be configured to block, when the flexible membrane is in an expanded state, the outlet and block, when the flexible membrane is in an additional expanded state, the additional outlet. In some examples, the pressure source may be connected to the input port, the additional pressure source may be connected to the additional input port, and the load may be connected to the output port.

In some examples, the flexible membrane may also be configured to unblock, when the flexible membrane is in an intermediate state or the additional expanded state, the outlet of the pressure chamber and unblock, when the flexible membrane is in the intermediate state or the expanded state, the additional outlet of the additional pressure chamber. In at least one example, the total surface area of the flexible membrane exposed to the pressure chamber when the flexible membrane is in the intermediate state may be equal to the total surface area of the flexible membrane exposed to the additional pressure chamber when the flexible membrane is in the intermediate state.

In some examples, the pressure chamber may include a circular wall, and the additional pressure chamber may include an additional circular wall. In one example, the outlet may be centered in the circular wall, and the additional outlet may be centered in the additional circular wall.

In some examples, the latch may further include (1) a contact protrusion surrounding the outlet and evenly extends into the pressure chamber and (2) an additional contact protrusion surrounds the additional outlet and evenly extends into the additional pressure chamber. In these examples, the flexible membrane may be configured to contact, when in the expanded state, the contact protrusion and contact, when in the additional expanded state, the additional contact protrusion.

In some examples, the latch may include a substantially rigid layer and an additional substantially rigid layer. The substantially rigid layer may form the input port, the output port, the pressure chamber, the inlet, the outlet, the first fluid channel, and the second fluid channel, and the additional substantially rigid layer may form the additional input port, the additional output port, the additional pressure chamber, the additional inlet, the additional outlet, the third fluid channel, and the fourth fluid channel. The flexible membrane may be sandwiched between opposing faces of the substantially rigid layer and the additional substantially rigid layer. In at least one example, the area of the outlet may be equal to the area of the additional outlet, and/or the volume of the pressure chamber may be equal to the volume of the additional pressure chamber.

A corresponding fluidic latch device may include an input port, an additional input port, an output port, an additional output port, a pressure chamber, an additional pressure chamber, and a gate. In some examples, the pressure chamber may include an inlet coupled to the input port by a first fluid channel and an outlet coupled to the output port by a second fluid channel, and the additional pressure chamber may include an additional inlet coupled to the additional input port by a third fluid channel and an additional outlet coupled to the additional output port by a fourth fluid channel. The gate may separate the pressure chamber and the additional pressure chamber and may be configured to block, when the gate is in an orientation, the outlet of the pressure chamber and block, when the gate is in an additional orientation, the additional outlet of the additional pressure chamber. In some examples, the gate may include a substantially rigid cylindrical gate or a flexible membrane.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 13 is a diagram of a truth table of an exemplary radial fluidic latch, according to some embodiments.

Figure 1:
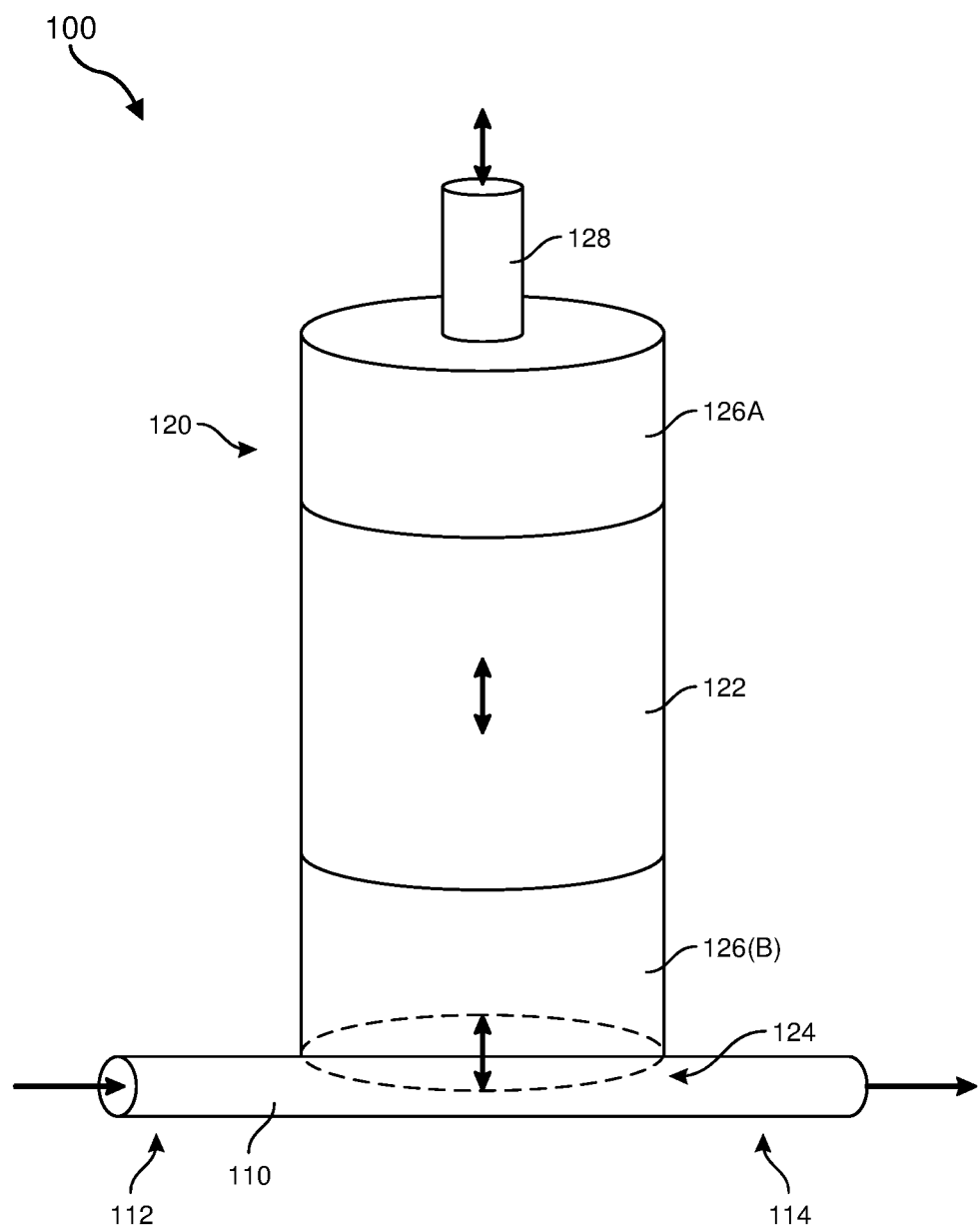
FIG. 1 is an illustration of an exemplary fluidic control system that may be used in connection with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to fluidic latches and systems. For example, as will be explained in greater detail below, embodiments of the instant disclosure may use a flexible membrane to create a latch (e.g., a unit of memory) that can hold a state for a fluidic system or circuit. In some examples, when no pressure is applied to either input of the latch, the flexible membrane may stay in its normal state (e.g., an unexpanded state where the flexible membrane does not block either of the latch's outputs). In the normal state, there may be no pressure at the latch's inputs, and no pressure at the latch's outputs. In some examples, pressurizing one of the latch's inputs may place the flexible membrane into an expanded state. In this expanded state, the flexible membrane may cause one of the latch's outputs to go high while simultaneously blocking the latch's other output such that any subsequent pressurization of the latch's other input will not cause its output to go high unless the first input goes low, thus creating a hold state. Embodiments of the instant disclosure may provide various features and advantages over traditional fluidic latches. For example, embodiments of the instant disclosure may provide a simple design for a fluidic latch that is capable of holding a state for a fluidic system or circuit using only a single moving component.

The present disclosure may include fluidic systems that involve the control (e.g., stopping, starting, restricting, increasing, etc.) of fluid flows through fluid channels. The control of fluid flow may be accomplished with a fluidic valve. FIG. 1 shows a schematic diagram of a fluidic valve 100 for controlling flow through a fluid channel 110, according to at least one embodiment of the present disclosure. Fluid from a fluid source (e.g., a pressurized fluid source, a fluid pump, etc.) may flow through the fluid channel 110 from an inlet port 112 to an outlet port 114, which may be operably coupled to, for example, a fluid-driven mechanism, another fluid channel, or a fluid reservoir.

Fluidic valve 100 may include a gate 120 for controlling the fluid flow through fluid channel 110. Gate 120 may include a gate transmission element 122, which may be a movable component that is configured to transmit an input force, pressure, or displacement to a restricting region 124 to restrict or stop flow through the fluid channel 110. Conversely, in some examples, application of a force, pressure, or displacement to gate transmission element 122 may result in opening restricting region 124 to allow or increase flow through the fluid channel 110. The force, pressure, or displacement applied to gate transmission element 122 may be referred to as a gate force, gate pressure, or gate displacement. Gate transmission element 122 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, gate 120 of fluidic valve 100 may include one or more gate terminals, such as an input gate terminal 126A and an output gate terminal 126B (collectively referred to herein as "gate terminals 126") on opposing sides of gate transmission element 122. Gate terminals 126 may be elements for applying a force (e.g., pressure) to gate transmission element 122. By way of example, gate terminals 126 may each be or include a fluid chamber adjacent to gate transmission element 122. Alternatively or additionally, one or more of gate terminals 126 may include a solid component, such as a spring, a lever, screw, or piston, that is configured to apply a force to gate transmission element 122.

In some examples, a gate port 128 may be in fluid communication with input gate terminal 126A for applying a positive or negative fluid pressure within the input gate terminal 126A. A control fluid source (e.g., a pressurized fluid source, a fluid pump, etc.) may be in fluid communication with gate port 128 to selectively pressurize and/or depressurize input gate terminal 126A. In additional embodiments, a force or pressure may be applied at the input gate terminal 126A in other ways, such as with a piezoelectric element or an electromechanical actuator, etc.

In the embodiment illustrated in FIG. 1, pressurization of the input gate terminal 126A may cause the gate transmission element 122 to be displaced toward restricting region 124, resulting in a corresponding pressurization of output gate terminal 126B. Pressurization of output gate terminal 126B may, in turn, cause restricting region 124 to partially or fully restrict to reduce or stop fluid flow through the fluid channel 110. Depressurization of input gate terminal 126A may cause gate transmission element 122 to be displaced away from restricting region 124, resulting in a corresponding depressurization of the output gate terminal 126B. Depressurization of output gate terminal 126B may, in turn, cause restricting region 124 to partially or fully expand to allow or increase fluid flow through fluid channel 110. Thus, gate 120 of fluidic valve 100 may be used to control fluid flow from inlet port 112 to outlet port 114 of fluid channel 110.

Figure 2:
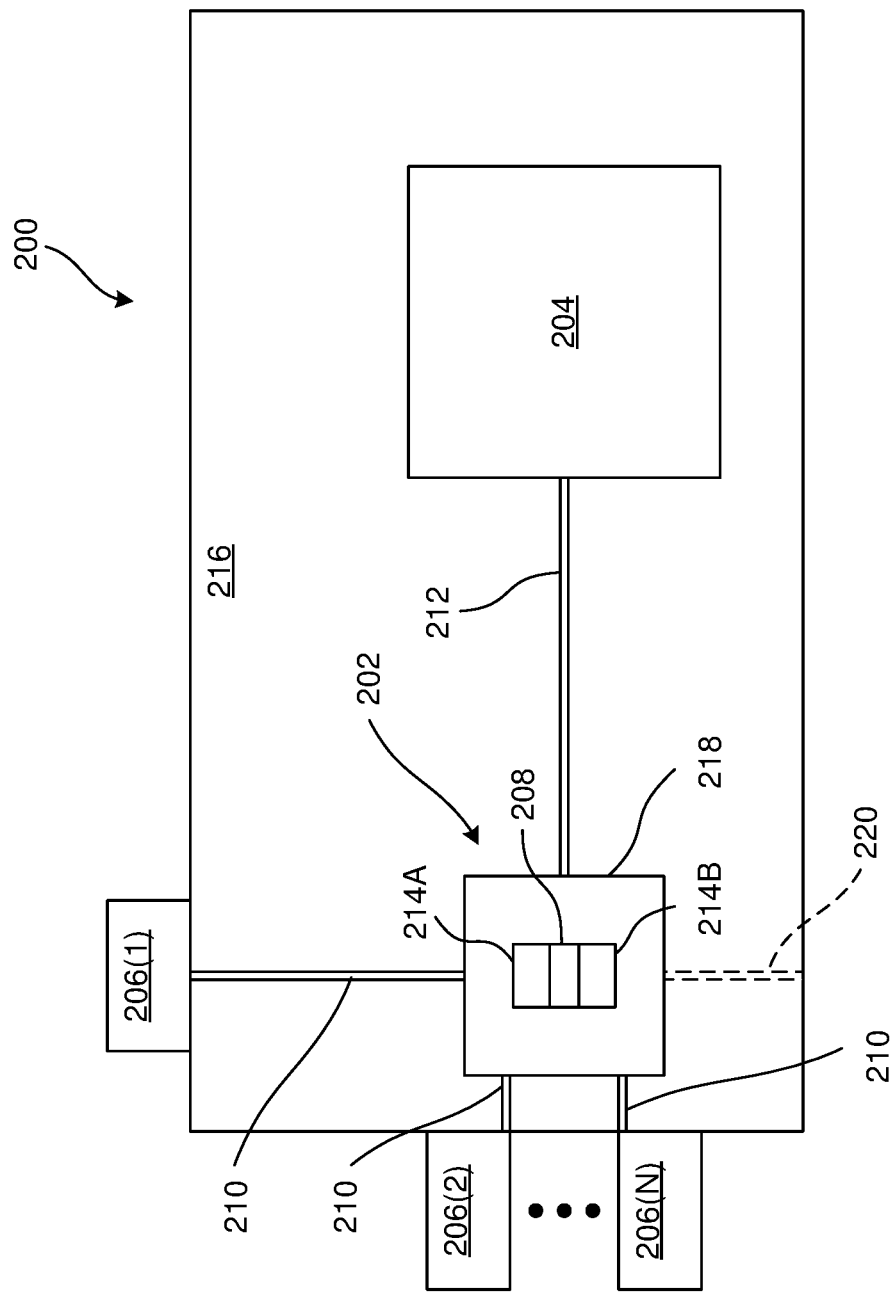
FIG. 2 is a block diagram of an exemplary fluidic system, according to at least one embodiment of the present disclosure.

FIG. 2 is a schematic view of a fluidic system 200 that includes a fluidic latch 202, a fluid-driven mechanism 204 configured to be activated, controlled, or fed by fluidic latch 202, and one or more fluid sources 206(1)-(N) for controlling and/or being controlled by fluidic latch 202. In some examples, the flow of a fluid from one of fluid sources 206(1)-(N) may be controlled by a gate 208 of fluidic latch 202. A port 210 (e.g., an inlet port or a control port) may provide fluid communication between each of fluid sources 206(1)-(N) and fluidic latch 202. An outlet port 212 may provide fluid communication between fluidic latch 202 and fluid-driven mechanism 204. As shown, fluidic latch 202 may include gate 208 that may be movable within a cavity 214 (e.g., an upper cavity 214A and lower cavity 214B) to open and close outlets of cavity 214 for controlling flow of the fluid.

Fluidic system 200 may include a substrate 216, within which or on which at least some of the components of fluidic system 200 are disposed. For example, at least a portion of substrate 216 may define one or more of a latch body 218 of fluidic latch 202, fluid sources 206, ports 210, outlet port 212, cavity 214, and/or fluid-driven mechanism 204. In some embodiments, substrate 216 may include a stack of materials, such as a drive body portion, at least one flexible material (e.g., an elastic material), a gate body portion, and/or a fluid channel body portion. In some examples, the term "flexible" may mean capable of flexing and/or returning to an original state without permanent damage. A flexible material may also be stretchable. In some examples, substrate 216 may include at least one of silicon, silicon dioxide, a glass, and/or a rigid polymer (e.g., a polycarbonate material, an acrylic material, a urethane material, a fluorinated elastomer material, a polysiloxane material, etc.).

Fluid-driven mechanism 204 may be any fluid load or mechanism that may be driven or controlled by flowing and/or pressurization of fluid at a fluidic scale. By way of example and not limitation, fluid-driven mechanism 204 may include at least one of a microelectromechanical device (e.g., a so-called "MEMS" device), an expansible cavity, a piston system, and/or a haptic feedback device. Each of fluid sources 206 may be any source or mechanism that can provide a pressurized fluid (e.g., gas (e.g., air, nitrogen, etc.) or liquid (e.g., water, oil, etc.)) to fluidic latch 202. By way of example and not limitation, fluid sources 206 may each be or include a pressurized reservoir, a fan, a pump, or a piston system, etc. In some examples, one or more of fluid sources 206 may be capable of providing a pressurized fluid at a high pressure and/or a low pressure. In general, a "high pressure" may be any pressure of a fluid that falls within a high or maximum pressure range, and a "low pressure" may be any pressure of a fluid that falls within a low or minimum pressure range. In some situations, a pressure falling within a high pressure range may be considered to represent one state (e.g., "1") of a bit or binary digit, and a pressure falling within a low pressure range may be considered to represent the other state (e.g., "0") of a bit or binary digit. In some examples, one or more fluid sources 206 may be a source of fluid pressures or a drain of fluid pressures.

Optionally, in some embodiments, an exhaust outlet 220 (shown in FIG. 2 in dashed lines) may be in fluid communication with fluidic latch 202. exhaust outlet 220 may enable one or more chambers within fluidic latch 202 to expand and/or contract as gate 208 is moved back and forth to open or close fluidic latch 202, as will be explained in further detail below.

In some embodiments, fluidic system 200 may be incorporated in a haptic feedback device, such as for use with an artificial reality (e.g., virtual reality, augmented reality, mixed reality, or hybrid reality) system. Fluidic system 200 may be positioned on or in a wearable device (e.g., a headband, a head-mounted display, a glove, an armband, etc.) that is configured to provide haptic feedback (e.g., vibration, pressure, etc.) to a user. For example, fluid-driven mechanism 204 of fluidic system 200 may be an expansible cavity configured to fill and expand with the fluid upon opening of fluidic latch 202. The expanding cavity may press against the user, and the user may sense the pressure from the expanding cavity, such as resulting from an action taken by the user in the artificial reality. By way of example, fluidic system 200 may be incorporated in a finger of a glove, and the user may use his or her finger in space to make a selection in an artificial reality environment. The expansible cavity of fluidic system 200 may be filled and expanded with the fluid to provide a pressure point on the user's finger to confirm the selection made by the user. The pressure point may provide a sensation that the user is touching a real object. Alternatively, fluid-driven mechanism 204 may include an eccentric rotating element that may be rotated by the flowing fluid when fluidic latch 202 is in an open state, resulting in a vibrating sensation as haptic feedback for the user.

Figure 3:
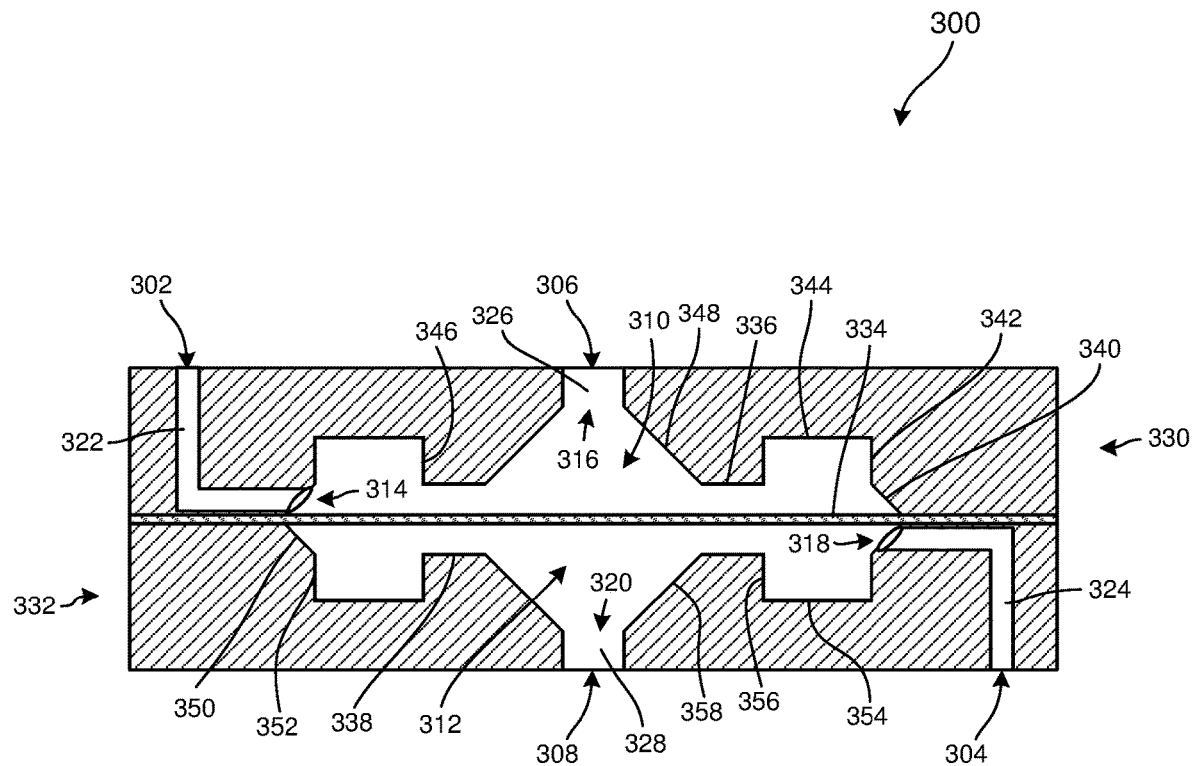
FIG. 3 is a schematic diagram of an exemplary radial fluidic latch, according to at least one embodiment of the present disclosure.

Fluidic latch 202 in FIG. 2 may have various forms and configurations. Examples of architectures that may be used for fluidic latch 202 are described below in connection with an exemplary radial fluidic latch 300 illustrated in FIGS. 3-13. FIG. 3 is a schematic diagram illustrating exemplary radial fluidic latch 300. As shown, radial fluidic latch 300 may include an Input/Output (I/O) port 302, an I/O port 304, an I/O port 306, and an I/O port 308. Radial fluidic latch 300 may also include an upper pressure chamber 310 and a lower pressure chamber 312. In some embodiments (e.g., when I/O ports 302 and 304 act as input ports (e.g., sources of fluid pressure) and I/O ports 306 and 308 act as output ports (e.g., drains of fluid pressure)), upper pressure chamber 310 may include an inlet 314 and an outlet 316, and lower pressure chamber 312 may include an inlet 318 and an outlet 320. As shown, a fluid channel 322 may convey fluid from I/O port 302 to inlet 314, a fluid channel 324 may convey fluid from I/O port 304 to inlet 318, a fluid channel 326 may convey fluid from outlet 316 to I/O port 306, and a fluid channel 328 may convey fluid from outlet 320 to I/O port 308. In other embodiments (e.g., when I/O ports 302 and 304 act as output ports and I/O ports 306 and 308 act as input ports), the chamber openings described above as inlets 314 and 318 may act as the respective outlets of upper pressure chamber 310 and lower pressure chamber 312, and the chamber openings described above as outlets 316 and 320 may act as respective inlets of upper pressure chamber 310 and lower pressure chamber 312.

Figure 4:
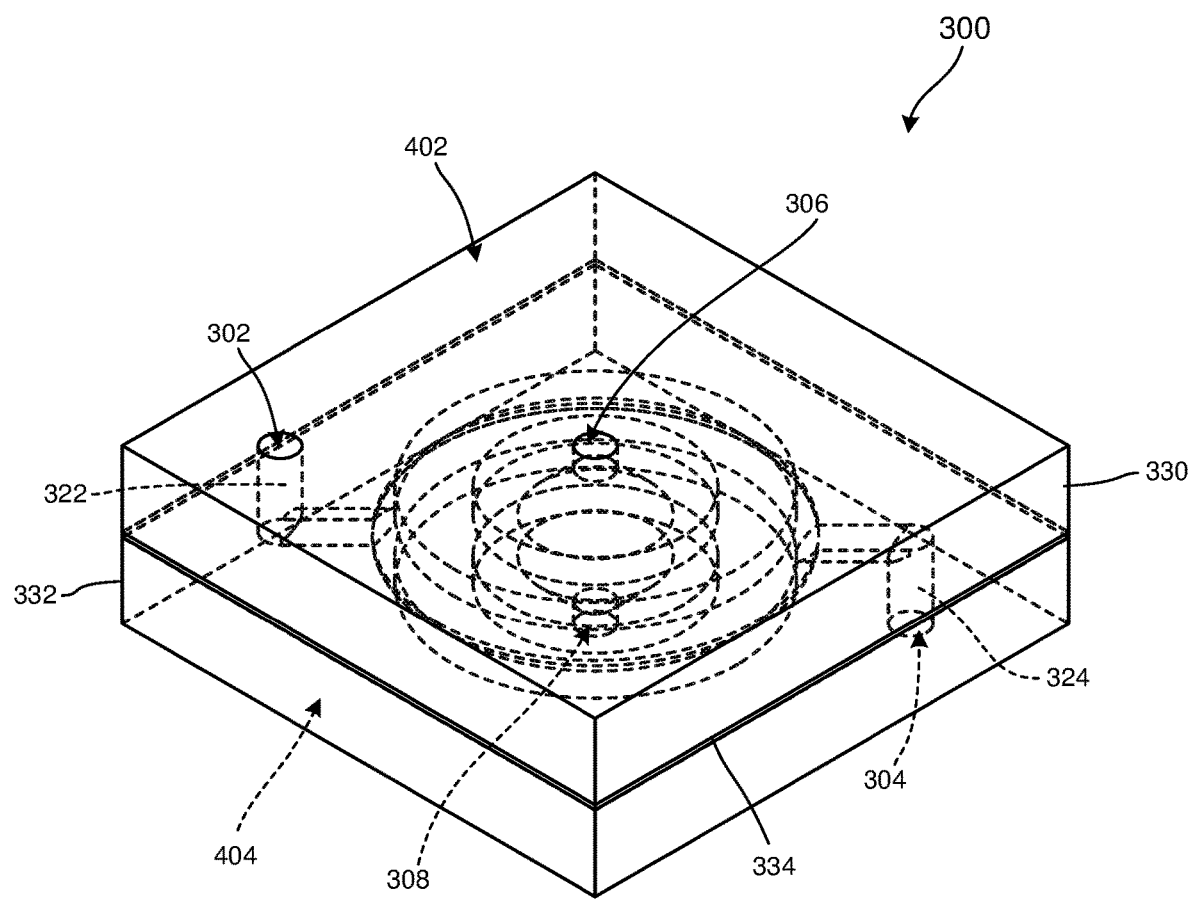
FIG. 4 is a partially transparent perspective view of an exemplary radial fluidic latch, according to at least one embodiment of the present disclosure.
Figure 6A:
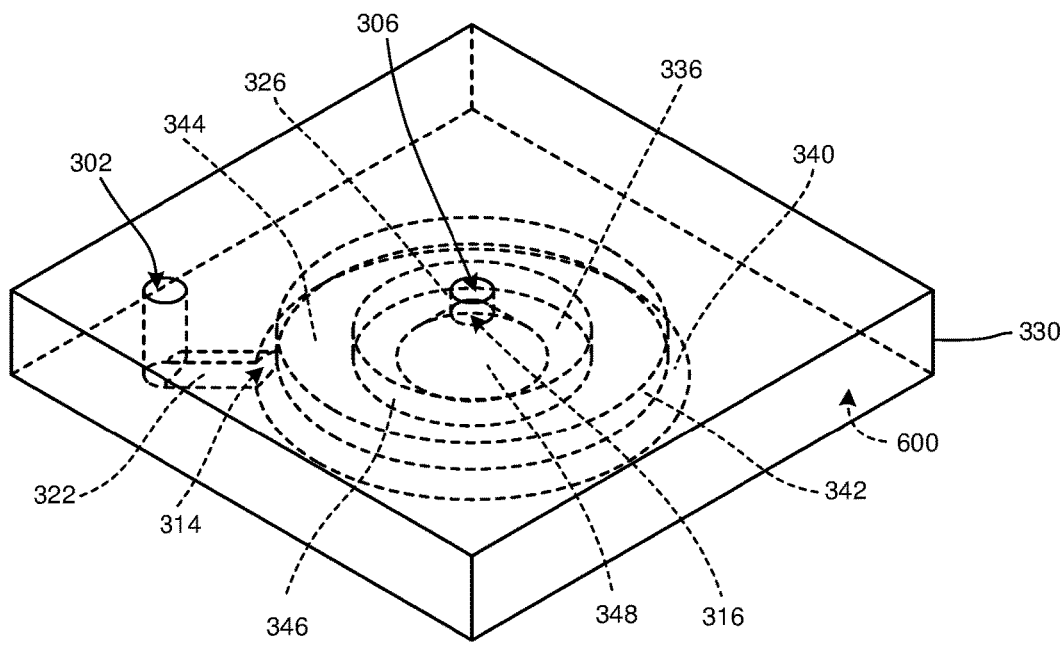
FIG. 6A is a partially transparent perspective view of the top layer of the exemplary radial fluidic latch of FIG. 4, according to at least one embodiment of the present disclosure.

As shown in FIGS. 3, 4, and 6A, in some examples, I/O port 302, I/O port 306, upper pressure chamber 310, inlet 314, outlet 316, and fluid channels 322 and 326 may be defined by an upper layer 330. In some examples, upper layer 330 may be formed from a single piece of a substantially rigid material (e.g., a rigid plastic, metal, or glass). Various surfaces of upper layer 330 may define upper pressure chamber 310. For example, upper pressure chamber 310 may be defined by a conical surface 340, a cylindrical surface 342, a ceiling surface 344, a cylindrical surface 346, a contact surface 336, and/or a conical surface 348. As shown in FIG. 7A, contact surface 336 may be defined by an edge 702 and an edge 704, and conical surface 340 may be defined by an edge 706 and an edge 708.

Figure 5:
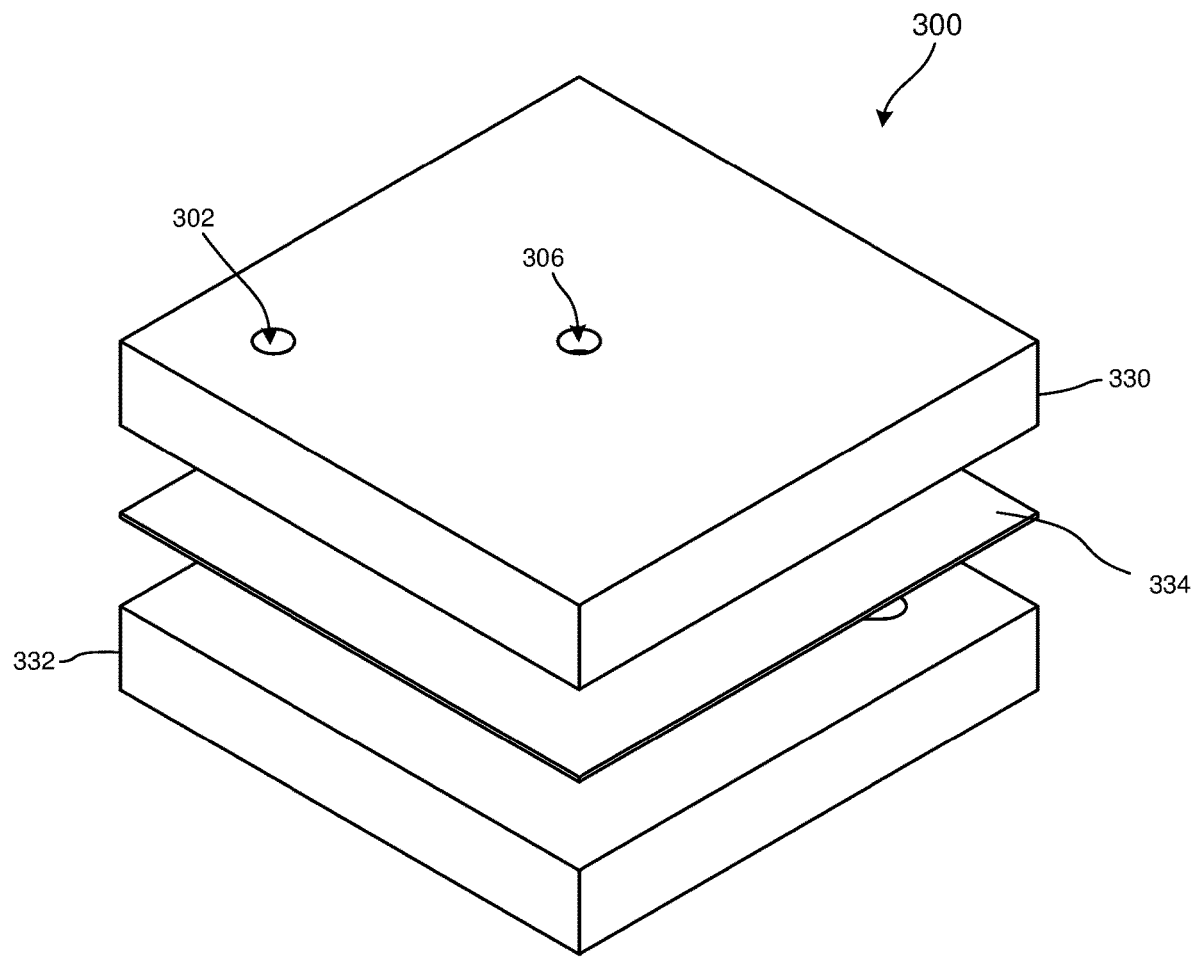
FIG. 5 is an exploded perspective view of the exemplary radial fluidic latch of FIG. 4, according to at least one embodiment of the present disclosure.
Figure 6B:
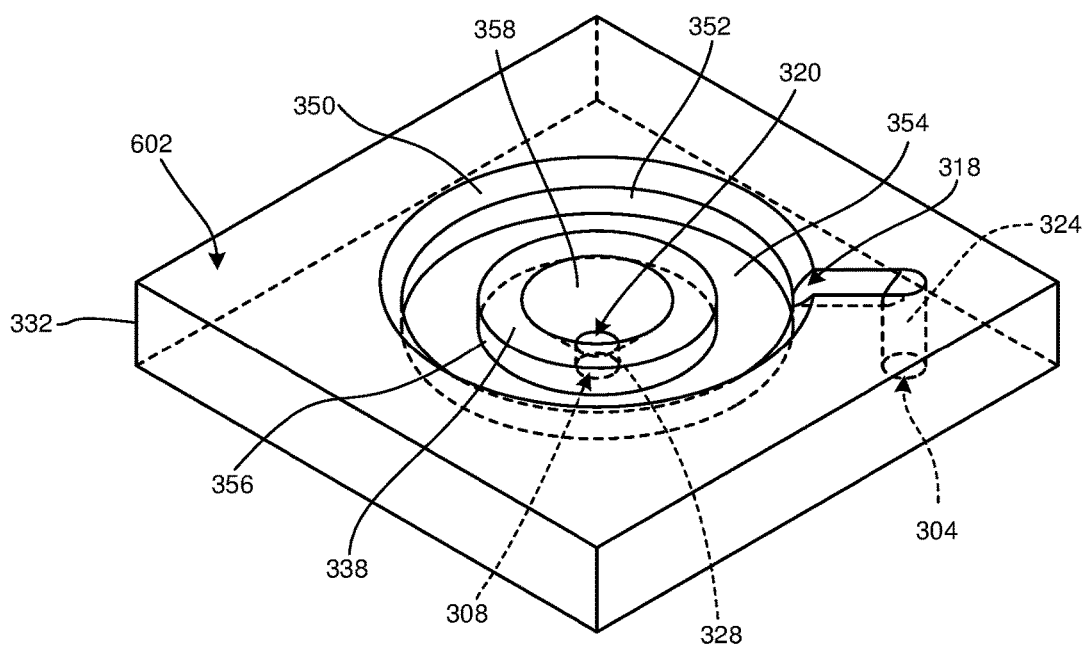
FIG. 6B is a partially transparent perspective view of the bottom layer of the exemplary radial fluidic latch of FIG. 4, according to at least one embodiment of the present disclosure.
Figure 7:
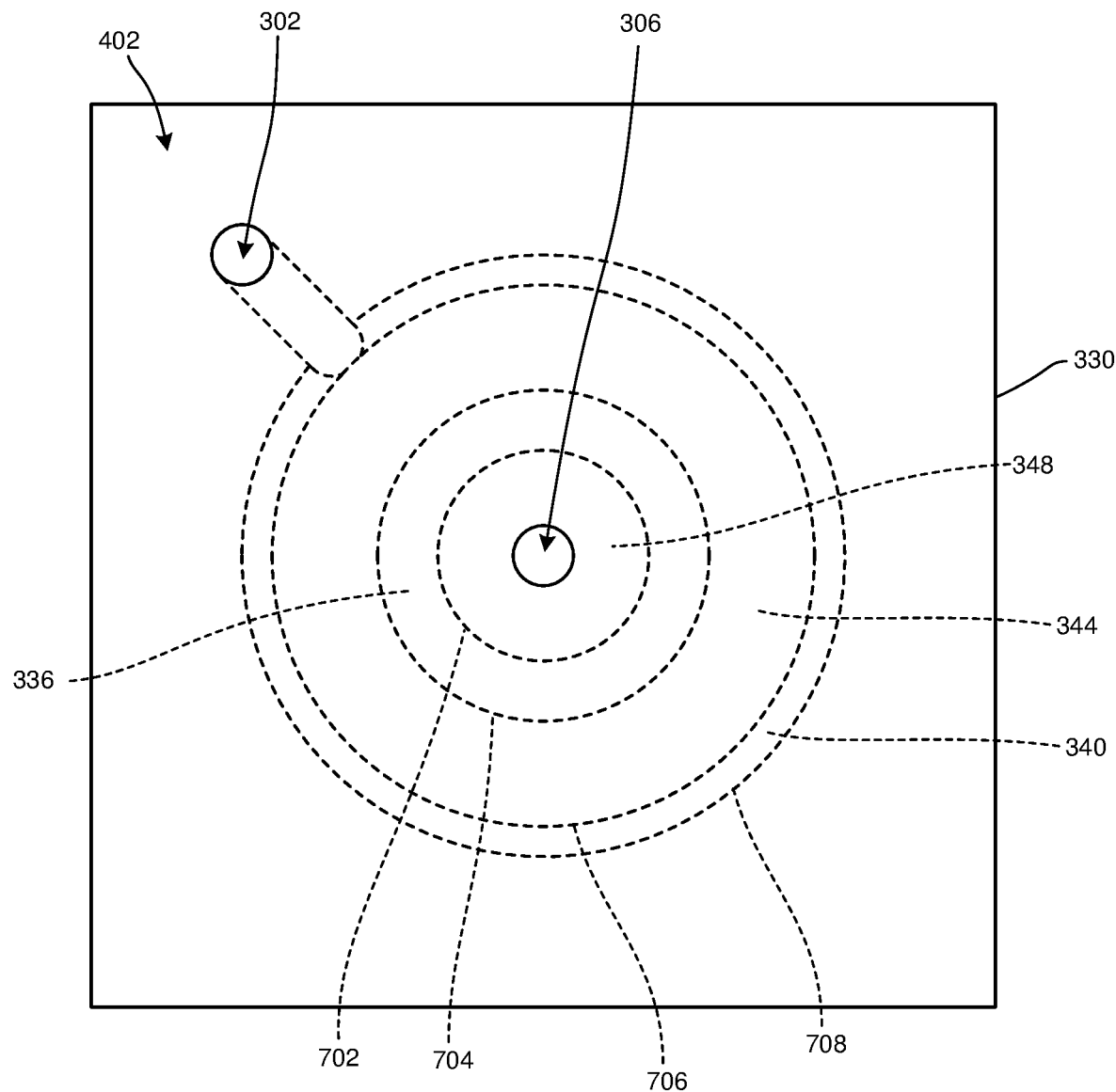
FIGS. 7-9 are partially transparent top-down views of the exemplary radial fluidic latch of FIG. 4, according to at least one embodiment of the present disclosure.

As shown in FIGS. 3, 4, and 6B, in some examples, I/O port 304, I/O port 308, lower pressure chamber 312, inlet 318, outlet 320, and fluid channels 324 and 328 may be defined by a lower layer 332. In some examples, lower layer 332 may be formed from a single piece of a substantially rigid material (e.g., a rigid plastic, metal, or glass). Various surfaces of lower layer 332 may define lower pressure chamber 312. For example, lower pressure chamber 312 may be defined by a conical surface 350, a cylindrical surface 352, a floor surface 354, a cylindrical surface 356, a contact surface 338, and a conical surface 358. As shown in FIGS. 3-12, upper pressure chamber 310 and lower pressure chamber 312 may each have a cylindrical/conical shape with circular cross-sections. However, the present disclosure is not so limited. For example, in additional embodiments, some or all of upper pressure chamber 310 and/or lower pressure chamber 312 may have a cubic shape with square cross-sections or a spherical shape with circular cross-sections. Moreover, while I/O ports 302-308, inlets 314 and 316, and outlets 318 and 320 are illustrated having particular positions and orientations, these elements may be positioned or oriented within upper layer 330 or lower layer 332 in any other suitable manner. As shown in FIG. 4, in some examples, I/O port 302 and I/O port 306 may be located on a top surface 402 of upper layer 330, and I/O port 304 and I/O port 308 may be located on a bottom surface 404 of lower layer 332.

Figure 11A:
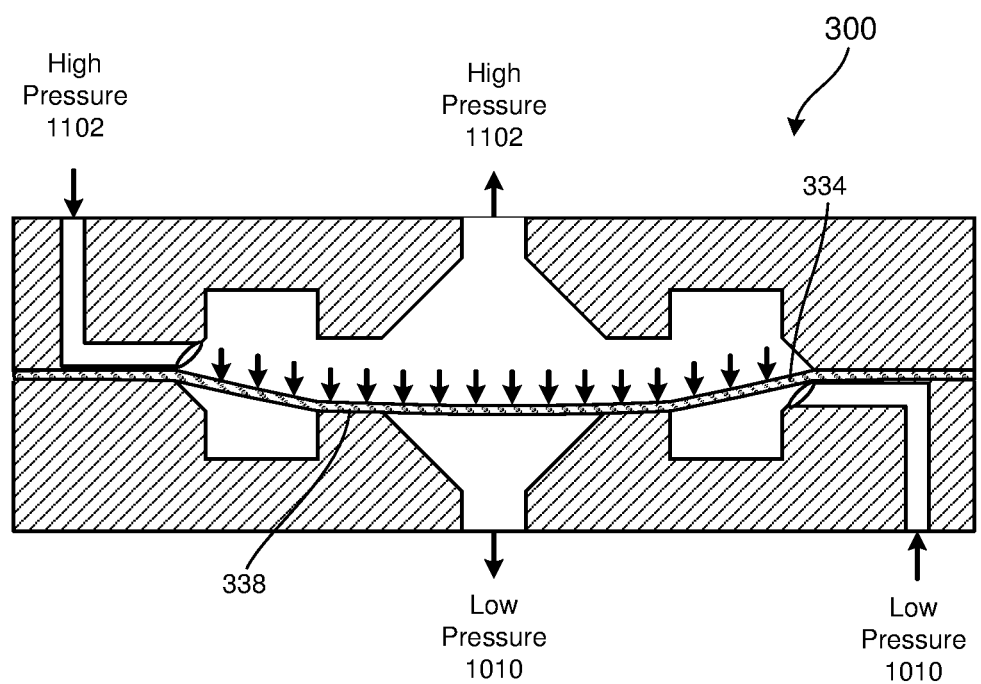
Figure 12A:
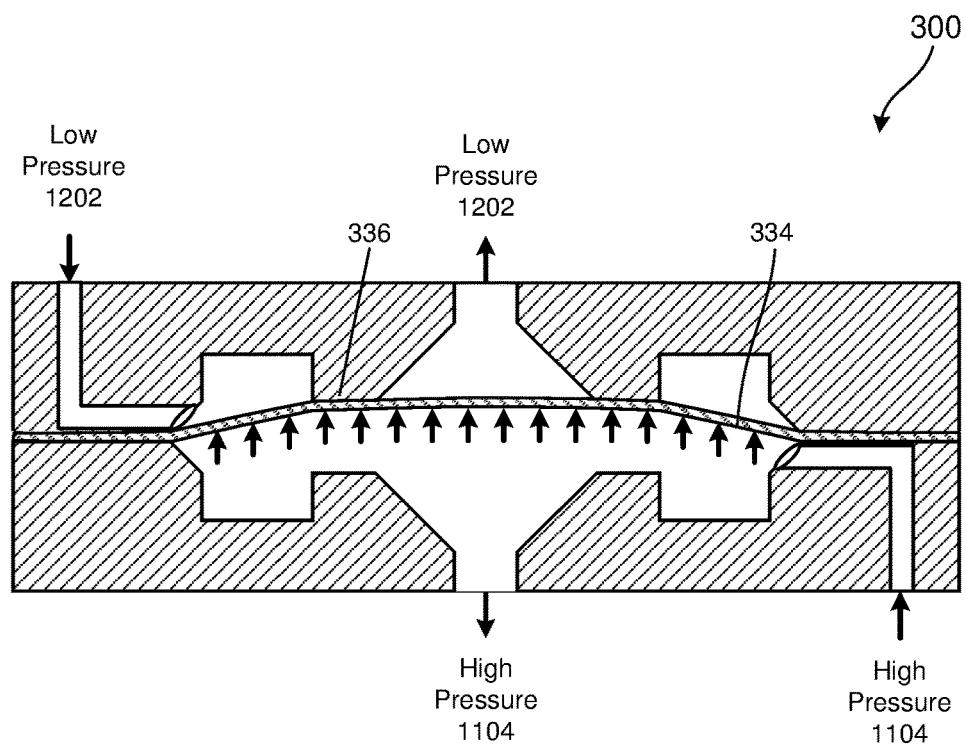

As shown in FIG. 3, radial fluidic latch 300 may include a flexible membrane 334 that separates and/or isolates upper pressure chamber 310 from lower pressure chamber 312. As shown in FIG. 5, flexible membrane 334 may be sandwiched between a bottom surface 600 of upper layer 330 and a top surface 602 of lower layer 332. In some examples, flexible membrane 334 may be formed of any suitable flexible or elastic material such as an elastic polymer (e.g., an elastomeric material, such as a polysiloxane material). Flexible membrane 334 may be configured to expand or stretch from the position illustrated in FIG. 3 into lower pressure chamber 312 when a fluid pressure in upper pressure chamber 310 is greater than a fluid pressure in lower pressure chamber 312 (e.g., as shown in FIG. 11A) or into upper pressure chamber 310 when a fluid pressure in lower pressure chamber 312 is greater than a fluid pressure in upper pressure chamber 310 (e.g., as shown in FIG. 12A). In some examples, flexible membrane 334 may be configured to create, in an expanded/stretched state, a seal against contact surface 336 that blocks or restricts fluid from flowing from inlet 314 to outlet 316. Additionally, flexible membrane 334 may be configured to create, in an expanded/stretched state, a seal against contact surface 338 that blocks or restricts fluid from flowing from inlet 318 to outlet 320.

Figure 8:
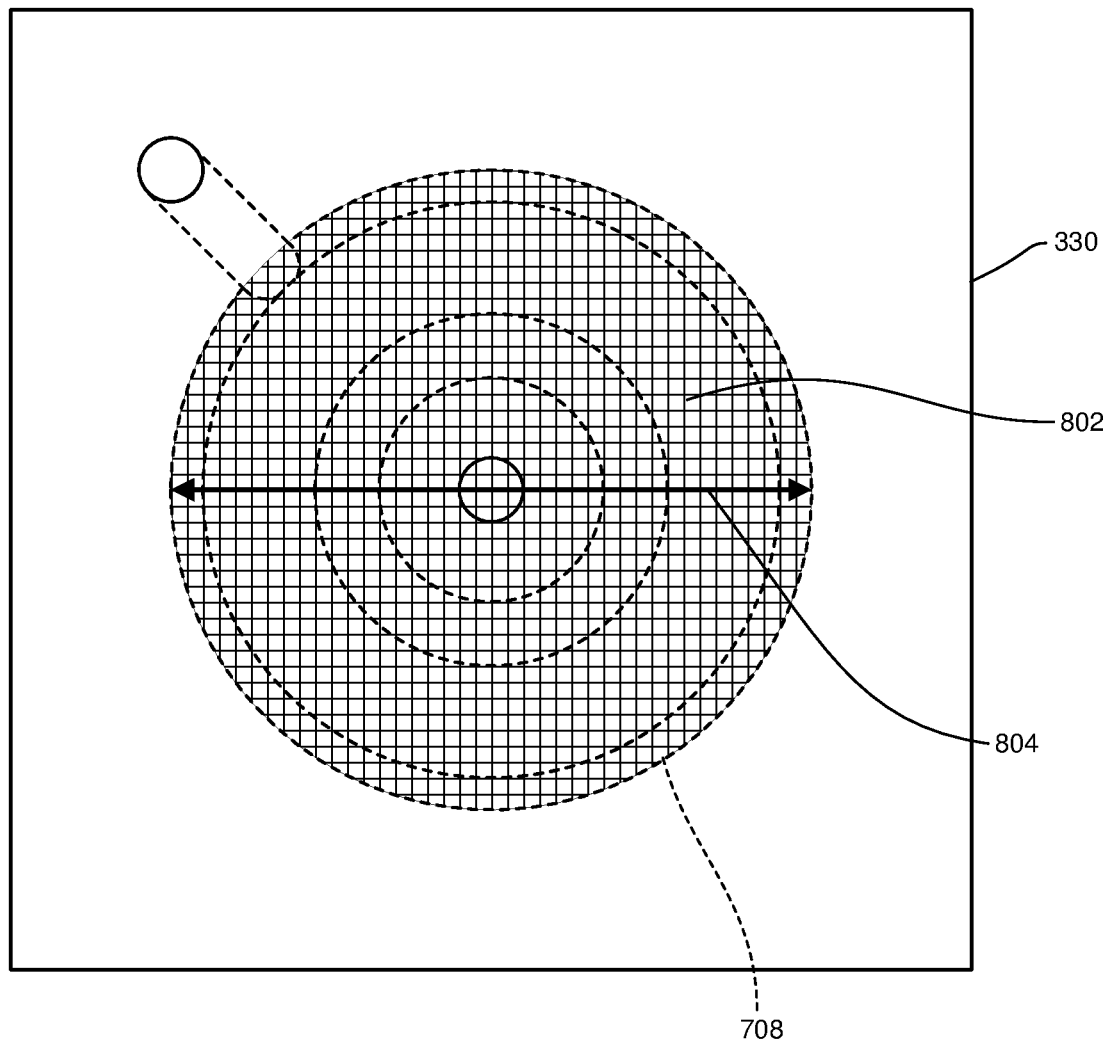

In some examples, the total surface area of flexible membrane 334 that is exposed to fluid in upper pressure chamber 310 when flexible membrane 334 is in an intermediate state (e.g., the state shown in FIG. 3) may be substantially equal to the total surface area of flexible membrane 334 exposed to fluid in lower pressure chamber 312 when flexible membrane 334 is in the intermediate state. For example, as shown in FIG. 8, a circular area 802 of flexible membrane 334 may be exposed to fluid in upper pressure chamber 310 and lower pressure chamber 312 when flexible membrane 334 is in an intermediate state. In this example, circular area 802 may have a diameter 804 (e.g., the distance between opposing sides of edge 708).

Figure 9:
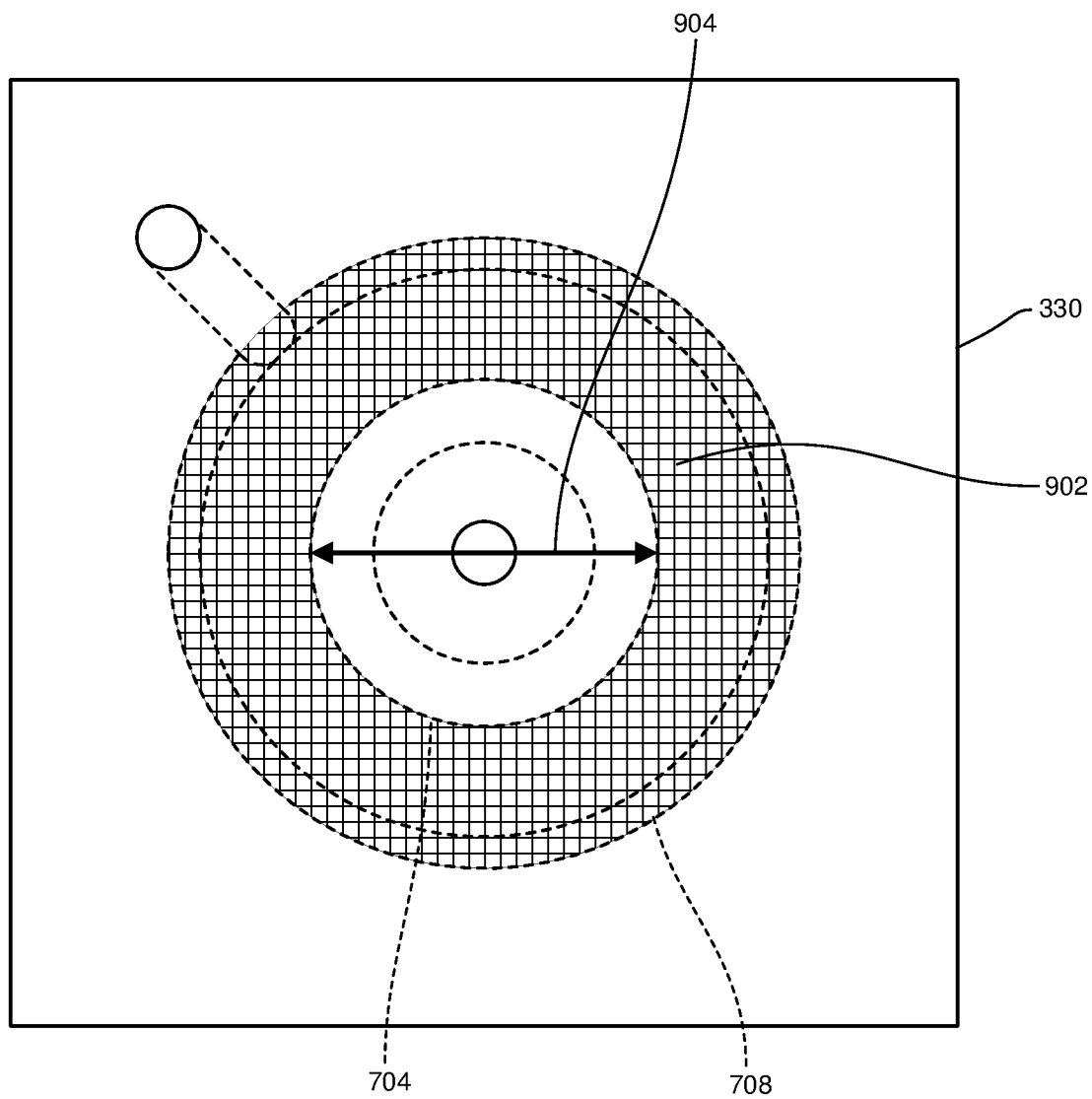

When in an expanded state, the total surface area of flexible membrane 334 that is exposed to fluid in upper pressure chamber 310 may be substantially different than the total surface area of flexible membrane 334 that is exposed to fluid in lower pressure chamber 312 as a result of flexible membrane 334 creating a seal against contact surfaces 336 or 338 (e.g., as shown in FIGS. 11A-12B). In the expanded state illustrated in FIGS. 11A and 11B, circular area 802 of flexible membrane 334 may be exposed to fluid in upper pressure chamber 310 and a circular-ring area 902 (as shown in FIG. 9) of flexible membrane 334 may be exposed to fluid in lower pressure chamber 312. In this example, circular-ring area 902 may have an outer diameter equal to diameter 804 and an inner diameter 904 (e.g., the distance between opposing sides of edge 704). Since the surface area of flexible membrane 334 that is exposed to a fluid in upper chamber 330 may be greater than the surface area of flexible membrane 334 that is exposed to a fluid in lower chamber 332, the fluid in upper chamber 330 may be capable of applying a greater downward force to flexible membrane 334 when compared to the upward force able to be provided by the fluid in lower chamber 332 if the two fluids have similar or identical pressures. Thus, in some examples, flexible membrane 334 may maintain the position shown in FIG. 11A even if fluid pressures at I/O ports 302 and 304 are equal, as shown in FIG. 11B.

Figure 12B:
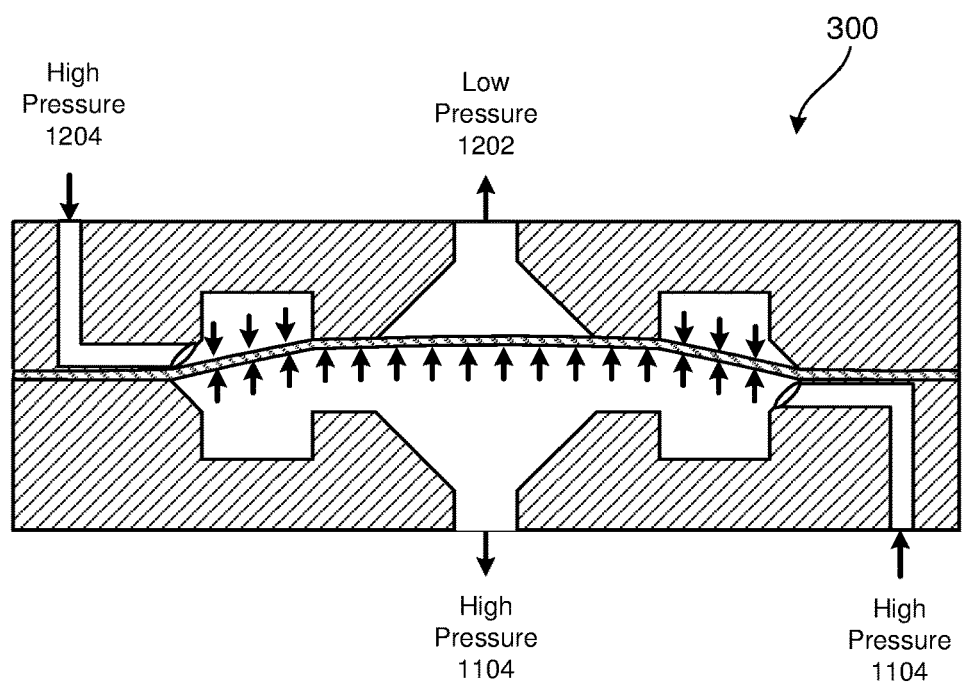

In the expanded state illustrated in FIGS. 12A and 12B, circular area 802 of flexible membrane 334 may be exposed to fluid in lower pressure chamber 312 and circular-ring area 902 of flexible membrane 334 may be exposed to fluid in upper pressure chamber 310. Since the surface area of flexible membrane 334 that is exposed to a fluid in lower chamber 332 may be greater than the surface area of flexible membrane 334 that is exposed to a fluid in upper chamber 330, the fluid in lower chamber 332 may be capable of applying a greater upward force to flexible membrane 334 when compared to the downward force able to be provided by the fluid in upper chamber 330 if the two fluids have similar or identical pressures. Thus, in some examples, flexible membrane 334 may maintain the position shown in FIG. 12A even if fluid pressures at I/O ports 302 and 304 are equal, as shown in FIG. 12B.

Figure 10A:
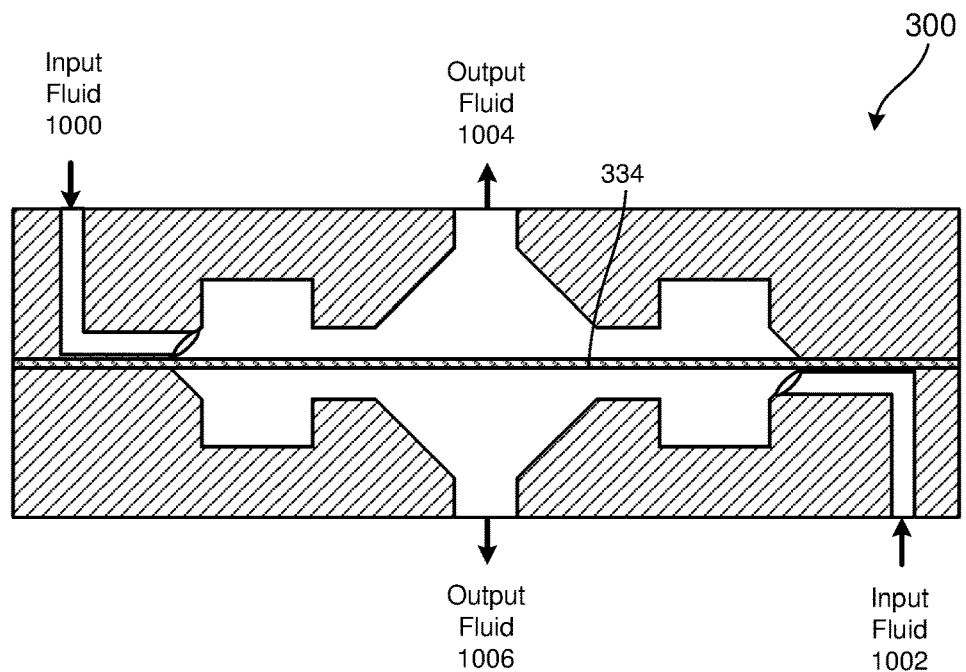
FIGS. 10A, 10B, 11A, 11B, 12A, and 12B are schematic diagrams of various states of an exemplary radial fluidic latch, according to some embodiments of the present disclosure.
Figure 10B:
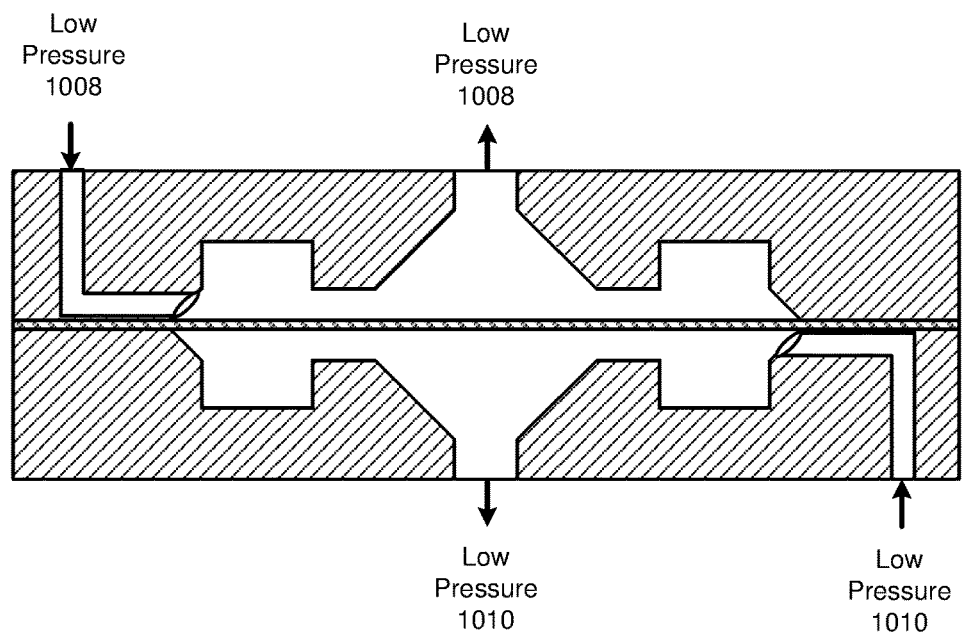

As shown in FIG. 10A, in some examples, radial fluidic latch 300 may be configured to act as a fluidic latch by applying an input fluid 1000 to I/O port 302 and an input fluid 1002 to I/O port 304. In this example, a stored state of radial fluidic latch 300 may be seen as output fluids 1004 or 1006. In alternative configurations (not shown), radial fluidic latch 300 may be configured to act as a fluidic latch by applying input fluid 1000 to I/O port 304 and/or input fluid 1002 to I/O port 308. In these alternative examples, a stored state of radial fluidic latch 300 may be seen as output fluids 1004 or 1006 at I/O ports 302 and 304, respectively.

FIGS. 10B-12B illustrate various possible states and state transitions of radial fluidic latch 300. As shown in FIG. 10A, if input fluid 1000 and input fluid 1002 respectively have low pressure 1008 and low pressure 1010, then flexible membrane 334 may be in the state shown. In this state, flexible membrane 334 may not block or restrict either of outlets 316 or 320. As shown, low pressure 1008 may be routed to upper pressure chamber 310 from I/O port 302 through fluid channel 322 to inlet 314 and then to I/O port 306 from outlet 316 of upper pressure chamber 310 through fluid channel 326. Similarly, low pressure 1010 may be routed to lower pressure chamber 312 from I/O port 304 through fluid channel 324 to inlet 318 and then to I/O port 308 from outlet 320 of lower pressure chamber 312 through fluid channel 328.

As shown in FIG. 11A, if input fluid 1000 transitions from low pressure 1008 to high pressure 1102 and input fluid 1002 maintains low pressure 1010, then high pressure 1102 may be routed to upper pressure chamber 310 from I/O port 302 through fluid channel 322 to inlet 314, and flexible membrane 334 may expand to the state shown. In this state, flexible membrane 334 may expand into lower pressure chamber 312 and seal against contact surface 338 and block outlet 320. As shown, high pressure 1102 may be routed to I/O port 306 from outlet 316 of upper pressure chamber 310 through fluid channel 326.

Figure 11B:
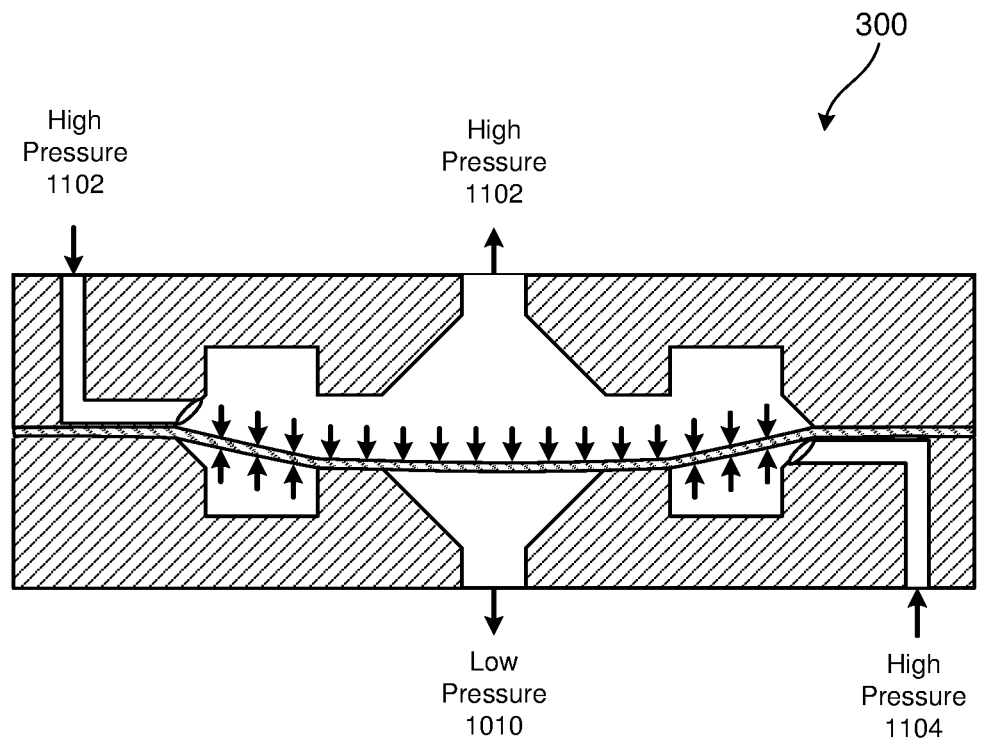

As shown in FIG. 11B, if input fluid 1002 transitions from low pressure 1010 to high pressure 1104 (e.g., a pressure equal to high pressure 1102) and input fluid 1000 maintains high pressure 1102, then high pressure 1104 may be routed to lower pressure chamber 312 from I/O port 304 through fluid channel 324 to inlet 318, but flexible membrane 334 may remain in the state shown. In this state, the surface area of flexible membrane 334 that is exposed to high pressure 1104 may be less than the surface area of flexible membrane 334 that is exposed to high pressure 1102, and flexible membrane 334 may remain expanded into lower pressure chamber 312 and sealed against contact surface 338 and blocking outlet 320. As shown, high pressure 1104 may be restricted from flowing to I/O port 308, and low pressure 1010 may remain at I/O port 308. In some embodiments, the state illustrated in FIG. 11B may represent a hold state of radial fluidic latch 300.

As shown in FIG. 12A, if input fluid 1000 transitions from high pressure 1102 to low pressure 1202 and input fluid 1002 maintains high pressure 1104, then low pressure 1202 may be routed to upper pressure chamber 310 from I/O port 302 through fluid channel 322 to inlet 314, and flexible membrane 334 may first shrink then expand to the state shown. In this state, flexible membrane 334 may expand into upper pressure chamber 310 and seal against contact surface 336 and block outlet 316. During the transition of flexible membrane 334, low pressure 1202 may have been routed to I/O port 304 from outlet 316 of upper pressure chamber 310 through fluid channel 326, and high pressure 1104 may be routed to I/O port 308 from outlet 320 of lower pressure chamber 312 through fluid channel 328.

As shown in FIG. 12B, if input fluid 1000 transitions from low pressure 1202 to high pressure 1204 (e.g., a pressure equal to high pressure 1104) and input fluid 1002 maintains high pressure 1104, then high pressure 1204 may be routed to upper pressure chamber 310 from I/O port 302 through fluid channel 322 to inlet 314, and flexible membrane 334 may remain in the state shown. In this state, the surface area of flexible membrane 334 that is exposed to high pressure 1204 may be less than the surface area of flexible membrane 334 that is exposed to high pressure 1104, and flexible membrane 334 may remain expanded into upper pressure chamber 310 and sealed against contact surface 336 blocking outlet 316. As shown, high pressure 1204 may be restricted from flowing to I/O port 306, and low pressure 1202 may remain at I/O port 306. In some embodiments, the state illustrated in FIG. 12B may represent a hold state of radial fluidic latch 300. FIG. 13 illustrates a latch truth table 1300 that may represent the functionality of radial fluidic latch 300 when configured as shown in FIG. 10A.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 1400 in FIG. 14. Other artificial reality systems may include a NED that also provides visibility into the real world (e.g., augmented-reality system 1500 in FIG. 15) or that visually immerses a user in an artificial reality (e.g., virtual-reality system 1600 in FIG. 16). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 14:
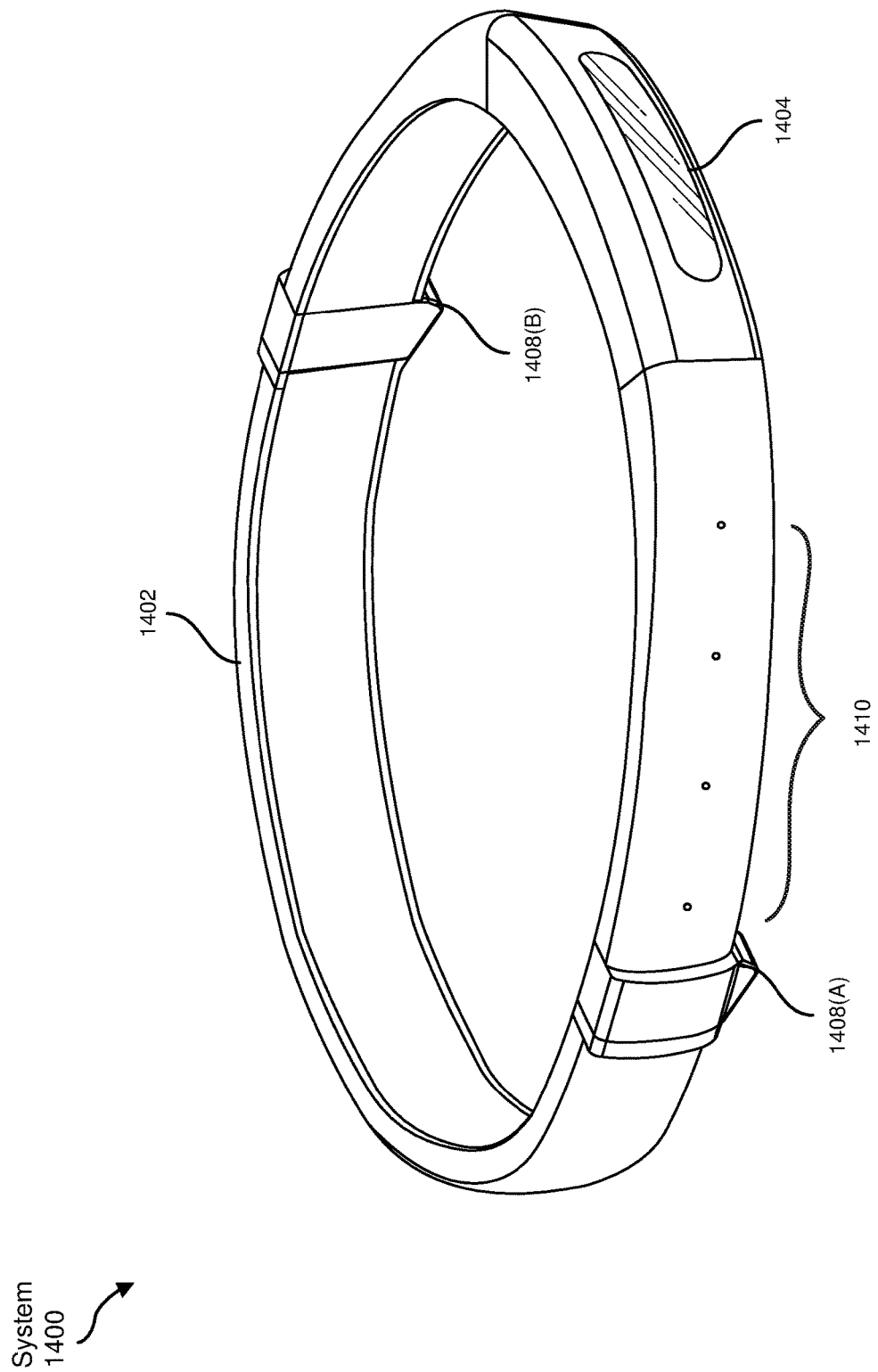
FIG. 14 is an illustration of an exemplary artificial-reality headband that may be used in connection with embodiments of this disclosure.

Turning to FIG. 14, augmented-reality system 1400 generally represents a wearable device dimensioned to fit about a body part (e.g., a head) of a user. As shown in FIG. 14, system 1400 may include a frame 1402 and a camera assembly 1404 that is coupled to frame 1402 and configured to gather information about a local environment by observing the local environment. Augmented-reality system 1400 may also include one or more audio devices, such as output audio transducers 1408(A) and 1408(B) and input audio transducers 1410. Output audio transducers 1408(A) and 1408(B) may provide audio feedback and/or content to a user, and input audio transducers 1410 may capture audio in a user's environment.

As shown, augmented-reality system 1400 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1400 may not include a NED, augmented-reality system 1400 may include other types of screens or visual feedback devices (e.g., a display screen integrated into a side of frame 1402).

Figure 15:
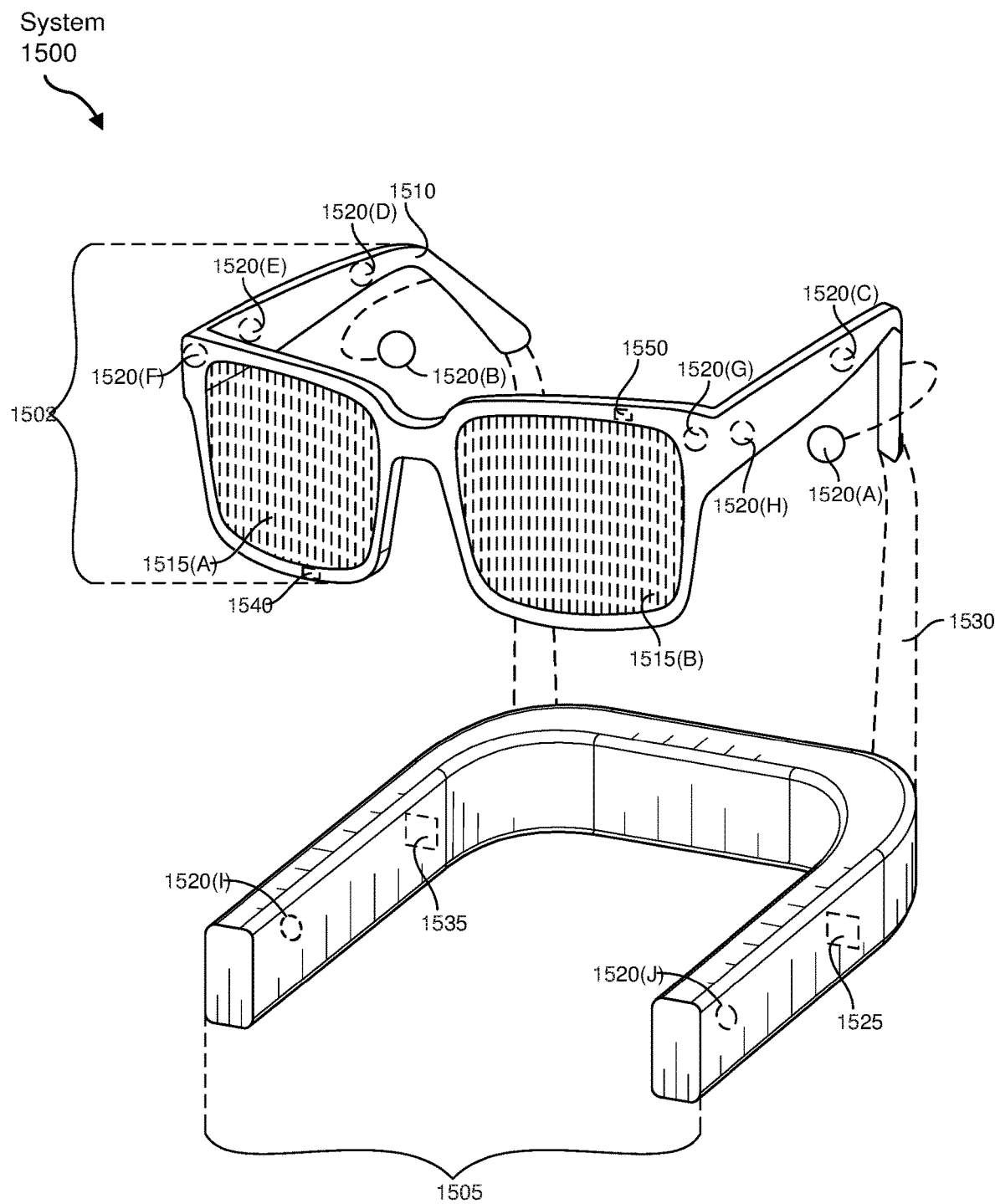
FIG. 15 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 15, augmented-reality system 1500 may include an eyewear device 1502 with a frame 1510 configured to hold a left display device 1515(A) and a right display device 1515(B) in front of a user's eyes. Display devices 1515(A) and 1515(B) may act together or independently to present an image or series of images to a user. While augmented-reality system 1500 includes two displays, embodiments of this disclosure may be implemented in augmented-reality systems with a single NED or more than two NEDs.

In some embodiments, augmented-reality system 1500 may include one or more sensors, such as sensor 1540. Sensor 1540 may generate measurement signals in response to motion of augmented-reality system 1500 and may be located on substantially any portion of frame 1510. Sensor 1540 may represent a position sensor, an inertial measurement unit (IMU), a depth camera assembly, or any combination thereof. In some embodiments, augmented-reality system 1500 may or may not include sensor 1540 or may include more than one sensor. In embodiments in which sensor 1540 includes an IMU, the IMU may generate calibration data based on measurement signals from sensor 1540. Examples of sensor 1540 may include, without limitation, accelerometers, gyroscopes, magnetometers, other suitable types of sensors that detect motion, sensors used for error correction of the IMU, or some combination thereof.

Augmented-reality system 1500 may also include a microphone array with a plurality of acoustic transducers 1520(A)-1520(J), referred to collectively as acoustic transducers 1520. Acoustic transducers 1520 may be transducers that detect air pressure variations induced by sound waves. Each acoustic transducer 1520 may be configured to detect sound and convert the detected sound into an electronic format (e.g., an analog or digital format). The microphone array in FIG. 2 may include, for example, ten acoustic transducers: 1520(A) and 1520(B), which may be designed to be placed inside a corresponding ear of the user, acoustic transducers 1520(C), 1520(D), 1520(E), 1520(F), 1520(G), and 1520(H), which may be positioned at various locations on frame 1510, and/or acoustic transducers 1520(1) and 1520(J), which may be positioned on a corresponding neckband 1505.

In some embodiments, one or more of acoustic transducers 1520(A)-(F) may be used as output transducers (e.g., speakers). For example, acoustic transducers 1520(A) and/or 1520(B) may be earbuds or any other suitable type of headphone or speaker.

The configuration of acoustic transducers 1520 of the microphone array may vary. While augmented-reality system 1500 is shown in FIG. 15 as having ten acoustic transducers 1520, the number of acoustic transducers 1520 may be greater or less than ten. In some embodiments, using higher numbers of acoustic transducers 1520 may increase the amount of audio information collected and/or the sensitivity and accuracy of the audio information. In contrast, using a lower number of acoustic transducers 1520 may decrease the computing power required by the controller 1550 to process the collected audio information. In addition, the position of each acoustic transducer 1520 of the microphone array may vary. For example, the position of an acoustic transducer 1520 may include a defined position on the user, a defined coordinate on frame 1510, an orientation associated with each acoustic transducer, or some combination thereof.

Acoustic transducers 1520(A) and 1520(B) may be positioned on different parts of the user's ear, such as behind the pinna or within the auricle or fossa. Or, there may be additional acoustic transducers on or surrounding the ear in addition to acoustic transducers 1520 inside the ear canal. Having an acoustic transducer positioned next to an ear canal of a user may enable the microphone array to collect information on how sounds arrive at the ear canal. By positioning at least two of acoustic transducers 1520 on either side of a user's head (e.g., as binaural microphones), augmented-reality device 1500 may simulate binaural hearing and capture a 3D stereo sound field around about a user's head. In some embodiments, acoustic transducers 1520(A) and 1520(B) may be connected to augmented-reality system 1500 via a wired connection 1530, and in other embodiments, acoustic transducers 1520(A) and 1520(B) may be connected to augmented-reality system 1500 via a wireless connection (e.g., a Bluetooth connection). In still other embodiments, acoustic transducers 1520(A) and 1520(B) may not be used at all in conjunction with augmented-reality system 1500.

Acoustic transducers 1520 on frame 1510 may be positioned along the length of the temples, across the bridge, above or below display devices 1515(A) and 1515(B), or some combination thereof. Acoustic transducers 1520 may be oriented such that the microphone array is able to detect sounds in a wide range of directions surrounding the user wearing the augmented-reality system 1500. In some embodiments, an optimization process may be performed during manufacturing of augmented-reality system 1500 to determine relative positioning of each acoustic transducer 1520 in the microphone array.

In some examples, augmented-reality system 1500 may include or be connected to an external device (e.g., a paired device), such as neckband 1505. Neckband 1505 generally represents any type or form of paired device. Thus, the following discussion of neckband 1505 may also apply to various other paired devices, such as charging cases, smart watches, smart phones, wrist bands, other wearable devices, hand-held controllers, tablet computers, laptop computers and other external compute devices, etc.

As shown, neckband 1505 may be coupled to eyewear device 1502 via one or more connectors. The connectors may be wired or wireless and may include electrical and/or non-electrical (e.g., structural) components. In some cases, eyewear device 1502 and neckband 1505 may operate independently without any wired or wireless connection between them. While FIG. 15 illustrates the components of eyewear device 1502 and neckband 1505 in example locations on eyewear device 1502 and neckband 1505, the components may be located elsewhere and/or distributed differently on eyewear device 1502 and/or neckband 1505. In some embodiments, the components of eyewear device 1502 and neckband 1505 may be located on one or more additional peripheral devices paired with eyewear device 1502, neckband 1505, or some combination thereof. Furthermore, Pairing external devices, such as neckband 1505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1500 may be provided by a paired device or shared between a paired device and an eyewear device, thus reducing the weight, heat profile, and form factor of the eyewear device overall while still retaining desired functionality. For example, neckband 1505 may allow components that would otherwise be included on an eyewear device to be included in neckband 1505 since users may tolerate a heavier weight load on their shoulders than they would tolerate on their heads. Neckband 1505 may also have a larger surface area over which to diffuse and disperse heat to the ambient environment. Thus, neckband 1505 may allow for greater battery and computation capacity than might otherwise have been possible on a stand-alone eyewear device. Since weight carried in neckband 1505 may be less invasive to a user than weight carried in eyewear device 1502, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1505 may be communicatively coupled with eyewear device 1502 and/or to other devices. These other devices may provide certain functions (e.g., tracking, localizing, depth mapping, processing, storage, etc.) to augmented-reality system 1500. In the embodiment of FIG. 15, neckband 1505 may include two acoustic transducers (e.g., 1520(1) and 1520(J)) that are part of the microphone array (or potentially form their own microphone subarray). Neckband 1505 may also include a controller 1525 and a power source 1535.

Acoustic transducers 1520(1) and 1520(J) of neckband 1505 may be configured to detect sound and convert the detected sound into an electronic format (analog or digital). In the embodiment of FIG. 15, acoustic transducers 1520(1) and 1520(J) may be positioned on neckband 1505, thereby increasing the distance between the neckband acoustic transducers 1520(1) and 1520(J) and other acoustic transducers 1520 positioned on eyewear device 1502. In some cases, increasing the distance between acoustic transducers 1520 of the microphone array may improve the accuracy of beamforming performed via the microphone array. For example, if a sound is detected by acoustic transducers 1520(C) and 1520(D) and the distance between acoustic transducers 1520(C) and 1520(D) is greater than, e.g., the distance between acoustic transducers 1520(D) and 1520(E), the determined source location of the detected sound may be more accurate than if the sound had been detected by acoustic transducers 1520(D) and 1520(E).

Controller 1525 of neckband 1505 may process information generated by the sensors on 1505 and/or augmented-reality system 1500. For example, controller 1525 may process information from the microphone array that describes sounds detected by the microphone array. For each detected sound, controller 1525 may perform a direction-of-arrival (DOA) estimation to estimate a direction from which the detected sound arrived at the microphone array. As the microphone array detects sounds, controller 1525 may populate an audio data set with the information. In embodiments in which augmented-reality system 1500 includes an inertial measurement unit, controller 1525 may compute all inertial and spatial calculations from the IMU located on eyewear device 1502. A connector may convey information between augmented-reality system 1500 and neckband 1505 and between augmented-reality system 1500 and controller 1525. The information may be in the form of optical data, electrical data, wireless data, or any other transmittable data form. Moving the processing of information generated by augmented-reality system 1500 to neckband 1505 may reduce weight and heat in eyewear device 1502, making it more comfortable to the user.

Power source 1535 in neckband 1505 may provide power to eyewear device 1502 and/or to neckband 1505. Power source 1535 may include, without limitation, lithium ion batteries, lithium-polymer batteries, primary lithium batteries, alkaline batteries, or any other form of power storage. In some cases, power source 1535 may be a wired power source. Including power source 1535 on neckband 1505 instead of on eyewear device 1502 may help better distribute the weight and heat generated by power source 1535.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1600 in FIG. 16, that mostly or completely covers a user's field of view. Virtual-reality system 1600 may include a front rigid body 1602 and a band 1604 shaped to fit around a user's head. Virtual-reality system 1600 may also include output audio transducers 1606(A) and 1606(B). Furthermore, while not shown in FIG. 16, front rigid body 1602 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1600 and/or virtual-reality system 1600 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1500 and/or virtual-reality system 1600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 1400, augmented-reality system 1500, and/or virtual-reality system 1600 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 14 and 16, output audio transducers 1408(A), 1408(B), 1606(A), and 1606(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1410 may include condenser microphones, dynamic microphones, ribbon microphones, and/or any other type or form of input transducer. In some embodiments, a single transducer may be used for both audio input and audio output.

Figure 16:
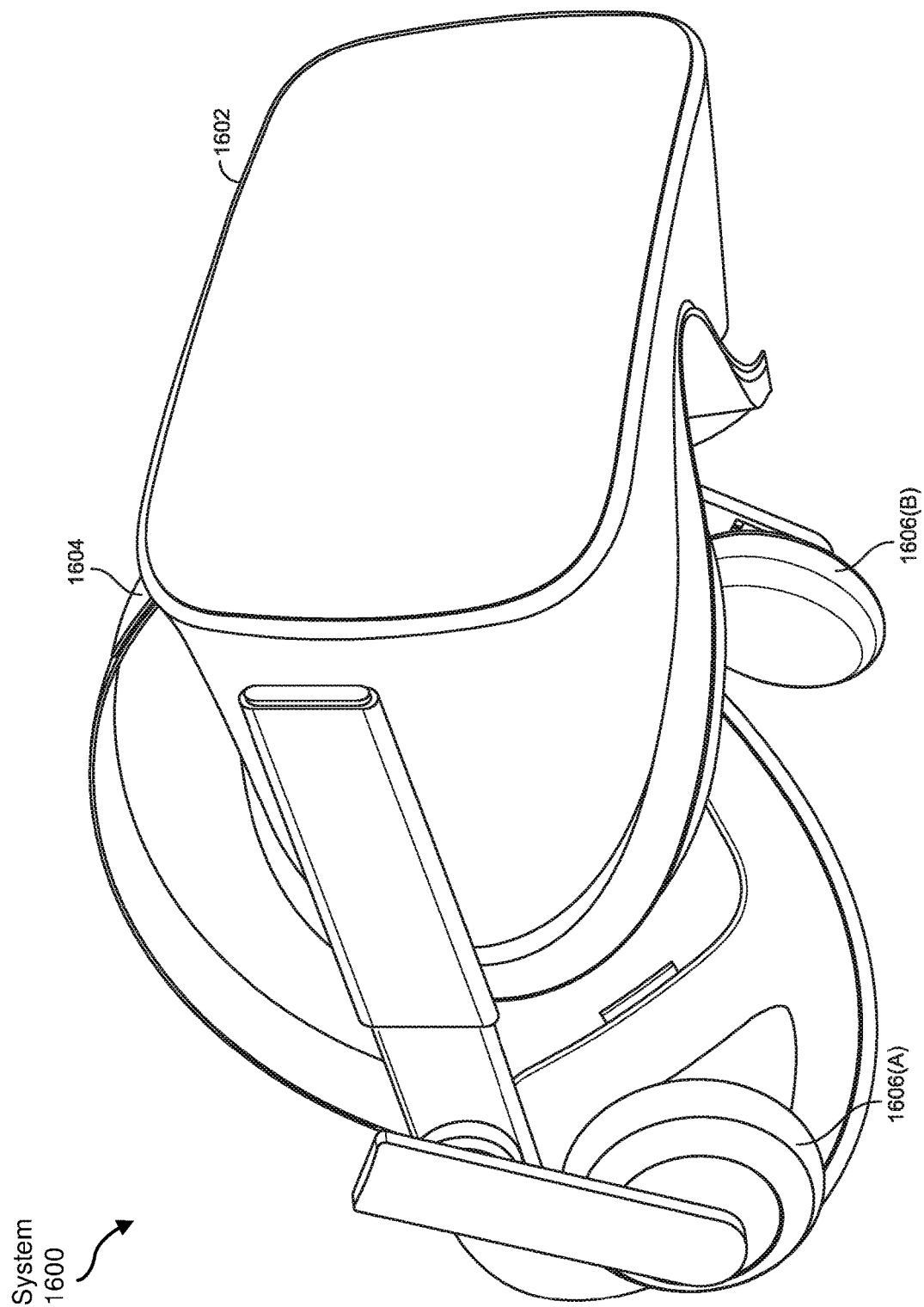
FIG. 16 is an illustration of an exemplary virtual-reality headset that may be used in connection with embodiments of this disclosure.

While not shown in FIGS. 14-16, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 1400, 1500, and 1600 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 17:
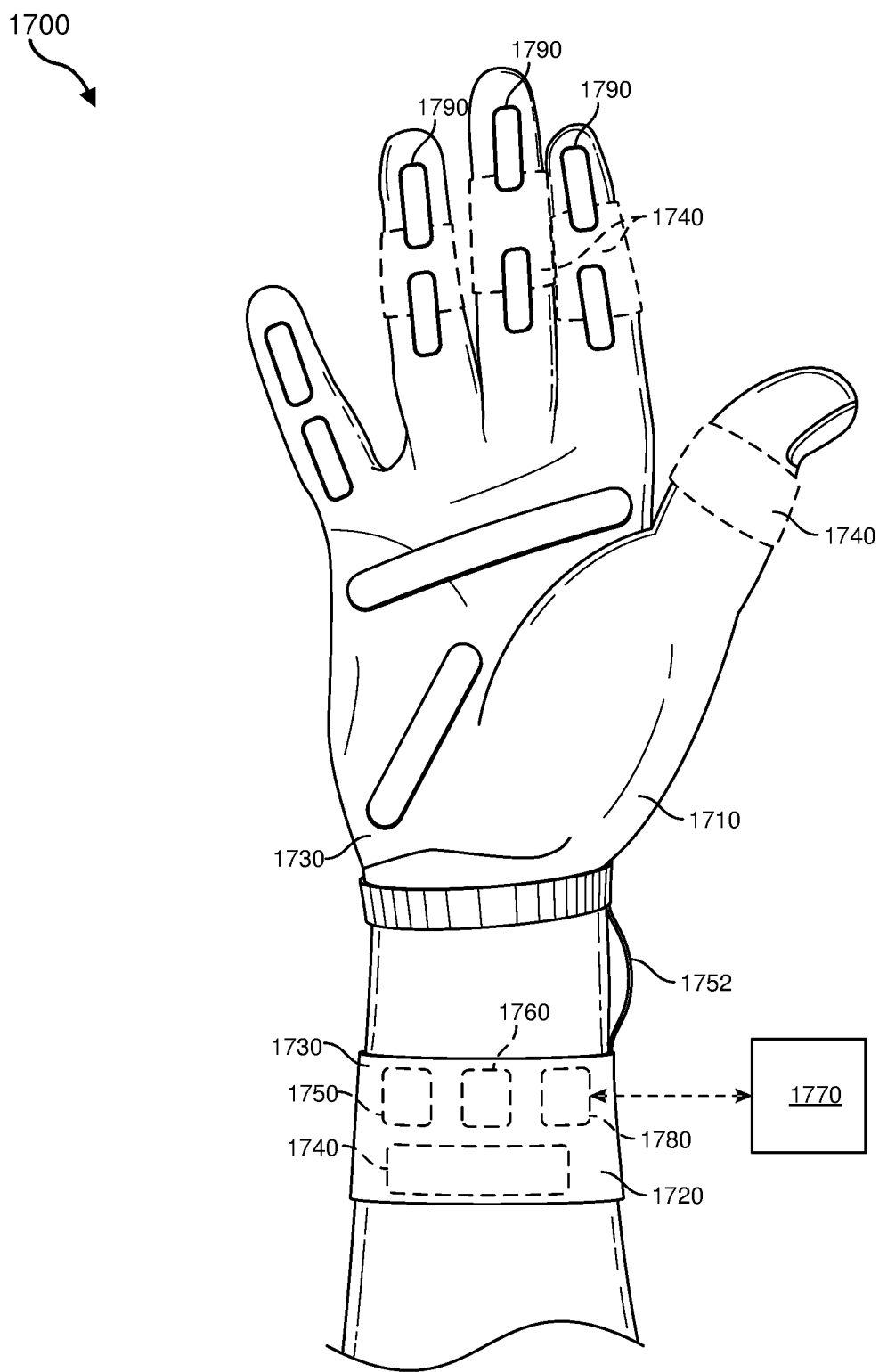
FIG. 17 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 17 illustrates a vibrotactile system 1700 in the form of a wearable glove (haptic device 1710) and wristband (haptic device 1720). Haptic device 1710 and haptic device 1720 are shown as examples of wearable devices that include a flexible, wearable textile material 1730 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1740 may be positioned at least partially within one or more corresponding pockets formed in textile material 1730 of vibrotactile system 1700. Vibrotactile devices 1740 may be positioned in locations to provide a vibrating sensation (e.g., haptic feedback) to a user of vibrotactile system 1700. For example, vibrotactile devices 1740 may be positioned to be against the user's finger(s), thumb, or wrist, as shown in FIG. 17. Vibrotactile devices 1740 may, in some examples, be sufficiently flexible to conform to or bend with the user's corresponding body part(s).

A power source 1750 (e.g., a battery) for applying a voltage to the vibrotactile devices 1740 for activation thereof may be electrically coupled to vibrotactile devices 1740, such as via conductive wiring 1752. In some examples, each of vibrotactile devices 1740 may be independently electrically coupled to power source 1750 for individual activation. In some embodiments, a processor 1760 may be operatively coupled to power source 1750 and configured (e.g., programmed) to control activation of vibrotactile devices 1740.

Vibrotactile system 1700 may be implemented in a variety of ways. In some examples, vibrotactile system 1700 may be a standalone system with integral subsystems and components for operation independent of other devices and systems. As another example, vibrotactile system 1700 may be configured for interaction with another device or system 1770. For example, vibrotactile system 1700 may, in some examples, include a communications interface 1780 for receiving and/or sending signals to the other device or system 1770. The other device or system 1770 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1780 may enable communications between vibrotactile system 1700 and the other device or system 1770 via a wireless (e.g., Wi-Fi, Bluetooth, cellular, radio, etc.) link or a wired link. If present, communications interface 1780 may be in communication with processor 1760, such as to provide a signal to processor 1760 to activate or deactivate one or more of the vibrotactile devices 1740.

Vibrotactile system 1700 may optionally include other subsystems and components, such as touch-sensitive pads 1790, pressure sensors, motion sensors, position sensors, lighting elements, and/or user interface elements (e.g., an on/off button, a vibration control element, etc.). During use, vibrotactile devices 1740 may be configured to be activated for a variety of different reasons, such as in response to the user's interaction with user interface elements, a signal from the motion or position sensors, a signal from the touch-sensitive pads 1790, a signal from the pressure sensors, a signal from the other device or system 1770, etc.

Although power source 1750, processor 1760, and communications interface 1780 are illustrated in FIG. 17 as being positioned in haptic device 1720, the present disclosure is not so limited. For example, one or more of power source 1750, processor 1760, or communications interface 1780 may be positioned within haptic device 1710 or within another wearable textile.

Figure 18:
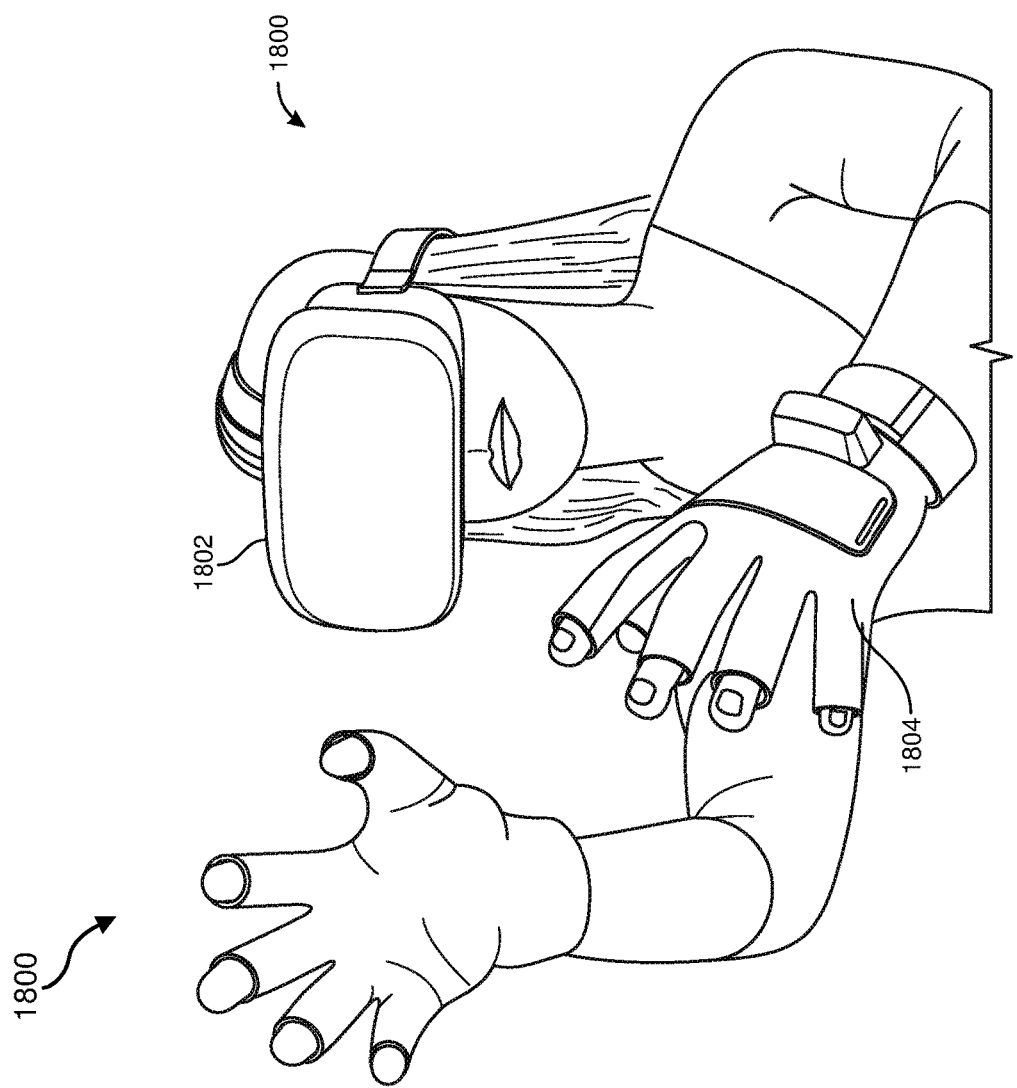
FIG. 18 is an illustration of an exemplary virtual-reality environment according to embodiments of this disclosure.

Haptic wearables, such as those shown in and described in connection with FIG. 17, may be implemented in a variety of types of artificial-reality systems and environments. FIG. 18 shows an example artificial reality environment 1800 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1802 generally represents any type or form of virtual-reality system, such as virtual-reality system 1600 in FIG. 16. Haptic device 1804 generally represents any type or form of wearable device, worn by a use of an artificial reality system, that provides haptic feedback to the user to give the user the perception that he or she is physically engaging with a virtual object. In some embodiments, haptic device 1804 may provide haptic feedback by applying vibration, motion, and/or force to the user. For example, haptic device 1804 may limit or augment a user's movement. To give a specific example, haptic device 1804 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1804 to send action requests to a console. Examples of action requests include, without limitation, requests to start an application and/or end the application and/or requests to perform a particular action within the application.

Figure 19:
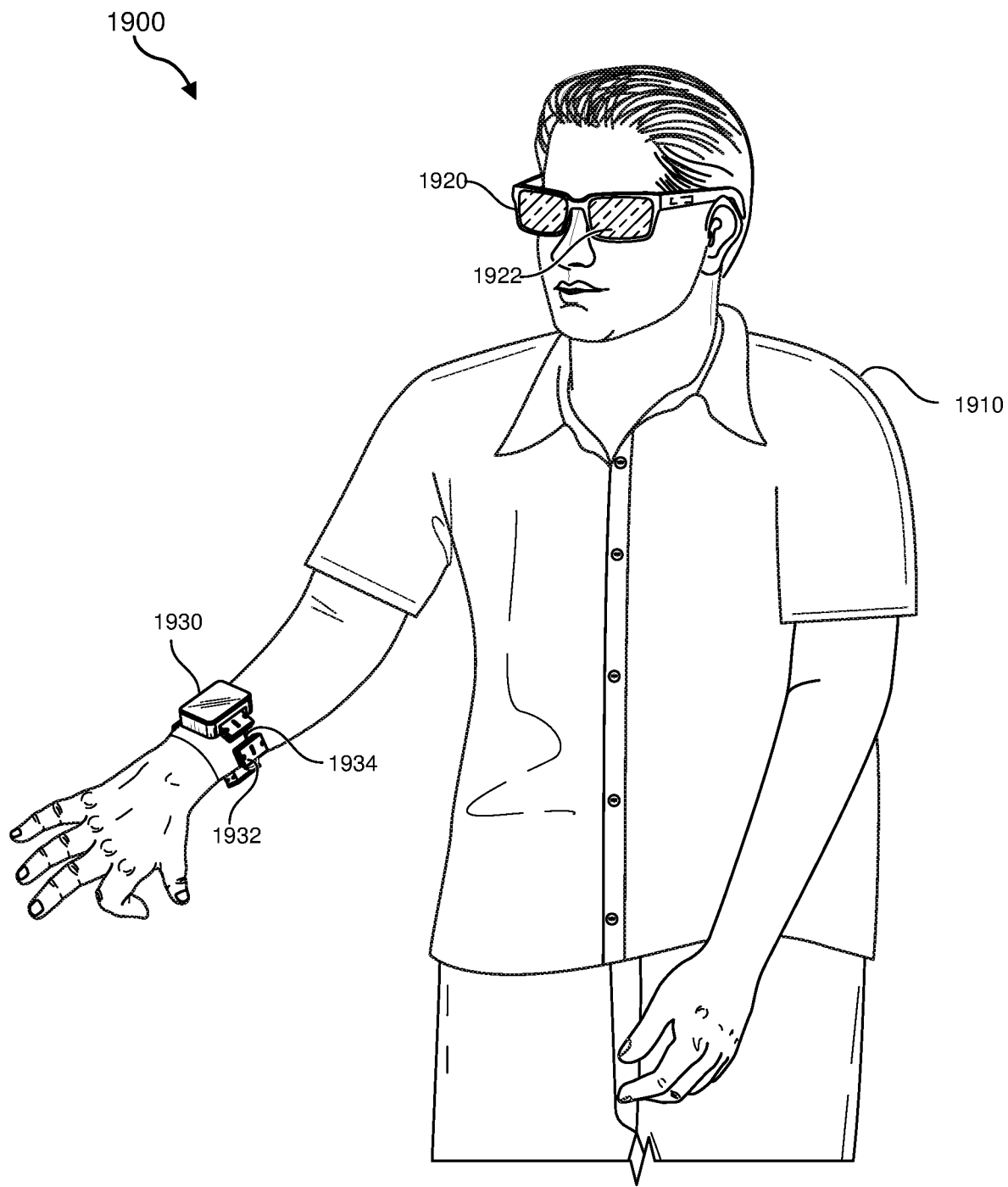
FIG. 19 is an illustration of an exemplary augmented-reality environment according to embodiments of this disclosure.

While haptic interfaces may be used with virtual-reality systems, as shown in FIG. 18, haptic interfaces may also be used with augmented-reality systems, as shown in FIG. 19. FIG. 19 is a perspective view a user 1910 interacting with an augmented-reality system 1900. In this example, user 1910 may wear a pair of augmented-reality glasses 1920 that have one or more displays 1922 and that are paired with a haptic device 1930. Haptic device 1930 may be a wristband that includes a plurality of band elements 1932 and a tensioning mechanism 1934 that connects band elements 1932 to one another.

One or more of band elements 1932 may include any type or form of actuator suitable for providing haptic feedback. For example, one or more of band elements 1932 may be configured to provide one or more of various types of cutaneous feedback, including vibration, force, traction, texture, and/or temperature. To provide such feedback, band elements 1932 may include one or more of various types of actuators. In one example, each of band elements 1932 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1710, 1720, 1804, and 1930 may include any suitable number and/or type of haptic transducer, sensor, and/or feedback mechanism. For example, haptic devices 1710, 1720, 1804, and 1930 may include one or more mechanical transducers, piezoelectric transducers, and/or fluidic transducers. Haptic devices 1710, 1720, 1804, and 1930 may also include various combinations of different types and forms of transducers that work together or independently to enhance a user's artificial-reality experience. In one example, each of band elements 1932 of haptic device 1930 may include a vibrotactor (e.g., a vibrotactile actuator) configured to vibrate in unison or independently to provide one or more of various types of haptic sensations to a user.

Embodiments of the instant disclosure may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A fluidic latch device comprising:
   a set-signal port, a reset-signal port, an output port, and a negated output port;
   a pressure chamber comprising:
      a first region;
      a second region;
      an inlet to the first region, the inlet being coupled to the set-signal port by a first fluid channel; and
      an outlet from the second region, the outlet being coupled to the output port by a second fluid channel;
   an additional pressure chamber comprising:
      a third region;
      a fourth region;
      an additional inlet to the third region, the additional inlet being coupled to the reset-signal port by a third fluid channel; and
      an additional outlet from the fourth region, the additional outlet being coupled to the negated output port by a fourth fluid channel; and
   a flexible membrane separating the pressure chamber and the additional pressure chamber and configured to:
      separate, when a high pressure is applied at the set-signal port and a low pressure is applied at the reset-signal port, the third region from the fourth region;
      separate, when a low pressure is applied at the set-signal port and a high pressure is applied at the reset-signal port, the first region from the second region;
      substantially hold, when a high pressure is applied at the set-signal port and a high pressure is applied at the reset-signal port, a current separating configuration of the flexible membrane.

2. The fluidic latch device of claim 1, wherein the flexible membrane is further configured to:
   rejoin, when a low pressure is applied at the set-signal port and a low pressure is applied at the reset-signal port, the first region to the second region or the third region to the fourth region; and
   substantially hold, when a high pressure is applied at the set-signal port and a high pressure is applied at the reset-signal port, a current pressure level at the output port.

3. The fluidic latch device of claim 2, wherein the total surface area of the flexible membrane exposed to the pressure chamber, when a low pressure is applied at the set-signal port and a low pressure is applied at the reset-signal port, is substantially equal to the total surface area of the flexible membrane exposed to the additional pressure chamber.

4. The fluidic latch device of claim 1, wherein the first region, the second region, the third region, and the fourth region are coaxially aligned.

5. The fluidic latch device of claim 4, wherein:
   the first region is an annular region coaxially aligned to the outlet; and
   the third region is an annular region coaxially aligned to the additional outlet.

6. The fluidic latch device of claim 1, further comprising:
   a contact protrusion surrounding the outlet and evenly extending towards the flexible membrane into the pressure chamber, wherein the flexible membrane is configured to contact, when a low pressure is applied at the set-signal port and a high pressure is applied at the reset-signal port, the contact protrusion; and
   an additional contact protrusion surrounding the additional outlet and evenly extending towards the flexible membrane into the additional pressure chamber, wherein the flexible membrane is configured to contact, when a high pressure is applied at the set-signal port and a low pressure is applied at the reset-signal port, the additional contact protrusion.

7. The fluidic latch device of claim 1, further comprising a substantially rigid layer and an additional substantially rigid layer, wherein:
the substantially rigid layer forms the set-signal port, the output port, the pressure chamber, the inlet, the outlet, the first fluid channel, and the second fluid channel;
the additional substantially rigid layer forms the reset-signal port, the negated output port, the additional pressure chamber, the additional inlet, the additional outlet, the third fluid channel, and the fourth fluid channel; and
the flexible membrane is sandwiched between opposing faces of the substantially rigid layer and the additional substantially rigid layer.

8. The fluidic latch device of claim 1, wherein:
a first annular surface area of the flexible membrane is exposed to the first region when a low pressure is applied at the set-signal port and a high pressure is applied at the reset-signal port;
a first circular surface area of the flexible membrane is exposed to the second region when a low pressure is applied at the set-signal port and a high pressure is applied at the reset-signal port;
a second annular surface area of the flexible membrane is exposed to the third region when a high pressure is applied at the set-signal port and a low pressure is applied at the reset-signal port;
a second circular surface area of the flexible membrane is exposed to the fourth region when a high pressure is applied at the set-signal port and a low pressure is applied at the reset-signal port; and
the first annular surface area, the second annular surface area, the first circular surface area, and the circular surface area are coaxially aligned.

9. The fluidic latch device of claim 1, wherein:
the volume of the first region is substantially equal to the volume of the third region; and
the volume of the second region is substantially equal to the volume of the fourth region.

10. A fluidic system comprising:
a latch comprising:
an input port, an additional input port, an output port, and an additional output port;
a pressure chamber comprising:
an inlet coupled to the input port by a first fluid channel; and
an outlet coupled to the output port by a second fluid channel;
an additional pressure chamber comprising:
an additional inlet coupled to the additional input port by a third fluid channel; and
an additional outlet coupled to the additional output port by a fourth fluid channel; and
a flexible membrane separating the pressure chamber and the additional pressure chamber and configured to:
block, when the flexible membrane is in an expanded state, the outlet; and
block, when the flexible membrane is in an additional expanded state, the additional outlet;
a pressure source connected to the input port;
an additional pressure source connected to the additional input port, wherein the pressure source and the additional pressure source are each independently drivable between at least a high-pressure state and a low-pressure state; and
a load connected to the output port.

11. The fluidic system of claim 10, wherein the flexible membrane is further configured to:
unblock, when the flexible membrane is in an intermediate state or the additional expanded state, the outlet of the pressure chamber; and
unblock, when the flexible membrane is in the intermediate state or the expanded state, the additional outlet of the additional pressure chamber.

12. The fluidic system of claim 11, wherein the total surface area of the flexible membrane exposed to the pressure chamber when the flexible membrane is in the intermediate state is equal to the total surface area of the flexible membrane exposed to the additional pressure chamber when the flexible membrane is in the intermediate state.

13. The fluidic system of claim 10, wherein:
the pressure chamber comprises a circular wall; and
the additional pressure chamber comprises an additional circular wall.

14. The fluidic system of claim 13, wherein:
the outlet is centered in the circular wall; and
the additional outlet is centered in the additional circular wall.

15. The fluidic system of claim 13, wherein the latch further comprises:
a contact protrusion surrounding the outlet and evenly extending into the pressure chamber, wherein the flexible membrane is configured to contact, when in the expanded state, the contact protrusion; and
an additional contact protrusion surrounding the additional outlet and evenly extending into the additional pressure chamber, wherein the flexible membrane is configured to contact, when in the additional expanded state, the additional contact protrusion.

16. The fluidic system of claim 10, wherein:
the latch further comprises a substantially rigid layer and an additional substantially rigid layer;
the substantially rigid layer forms the input port, the output port, the pressure chamber, the inlet, the outlet, the first fluid channel, and the second fluid channel;
the additional substantially rigid layer forms the additional input port, the additional output port, the additional pressure chamber, the additional inlet, the additional outlet, the third fluid channel, and the fourth fluid channel; and
the flexible membrane is sandwiched between opposing faces of the substantially rigid layer and the additional substantially rigid layer.

17. The fluidic system of claim 10, wherein the area of the outlet is equal to the area of the additional outlet.

18. The fluidic system device of claim 10, wherein the volume of the pressure chamber is equal to the volume of the additional pressure chamber.

19. A fluidic latch device comprising:
a set-signal port, a reset-signal port, an output port, and a negated output port;
a pressure chamber comprising:
a first region;
a second region;
an inlet to the first region, the inlet being coupled to the set-signal port by a first fluid channel; and
an outlet from the second region, the outlet being coupled to the output port by a second fluid channel;
an additional pressure chamber comprising:

a third region;

a fourth region;

an additional inlet to the third region, the additional inlet being coupled to the reset-signal port by a third fluid channel; and an additional outlet from the fourth region, the additional outlet being coupled to the negated output port by a fourth fluid channel; and a gate separating the pressure chamber and the additional pressure chamber and configured to:

separate, when a high pressure is applied at the set-signal port and a low pressure is applied at the reset-signal port, the third region from the fourth region;

separate, when a low pressure is applied at the set-signal port and a high pressure is applied at the reset-signal port, the first region from the second region;

substantially hold, when a high pressure is applied at the set-signal port and a high pressure is applied at the reset-signal port, a current separating position of the flexible membrane.

20. The fluidic latch device of claim 19, wherein the gate comprises one of:

a substantially rigid cylindrical gate; or a flexible membrane.

* * * * *